(12) United States Patent
Young-Lai

(10) Patent No.: US 7,849,073 B2
(45) Date of Patent: Dec. 7, 2010

(54) LOAD BALANCING FOR COMPLEX DATABASE QUERY PLANS

(75) Inventor: Matthew Young-Lai, Waterloo (CA)

(73) Assignee: iAnywhere Solutions, Inc., Dublin, CA (US)

( * ) Notice: Subject to any disclaimer, the term of this patent is extended or adjusted under 35 U.S.C. 154(b) by 671 days.

(21) Appl. No.: 11/640,396

(22) Filed: Dec. 18, 2006

(65) Prior Publication Data

US 2008/0147599 A1 Jun. 19, 2008

(51) Int. Cl.
*G06F 7/00* (2006.01)
(52) U.S. Cl. .................. 707/713; 707/714; 707/718
(58) Field of Classification Search .......... 707/2, 707/3, 7, 100
See application file for complete search history.

(56) References Cited

U.S. PATENT DOCUMENTS

| | | | | |
|---|---|---|---|---|
| 5,241,648 | A * | 8/1993 | Cheng et al. .................. | 707/7 |
| 5,692,174 | A * | 11/1997 | Bireley et al. .................. | 1/1 |
| 6,311,265 | B1 * | 10/2001 | Beckerle et al. ............ | 712/203 |
| 6,392,497 | B1 | 5/2002 | Takikawa | |
| 6,430,550 | B1 * | 8/2002 | Leo et al. .................. | 707/2 |
| 6,516,310 | B2 | 2/2003 | Paulley | |
| 6,694,310 | B1 * | 2/2004 | Yu et al. .................. | 707/718 |
| 6,704,724 | B1 * | 3/2004 | Ellmann et al. ............ | 707/718 |
| 6,807,546 | B2 | 10/2004 | Young-Lai | |
| 2003/0229640 | A1 * | 12/2003 | Carlson et al. ............ | 707/100 |
| 2006/0080285 | A1 * | 4/2006 | Chowdhuri .................. | 707/3 |

OTHER PUBLICATIONS

"Topaz: a Cost-based, Rule-Driven, Multi-phase Parallelizer," by Nippl and Mitschang. IN: Proceedings of the 24th VLDB Conference (1998). Available at: http://citeseerx.ist.psu.edu/viewdoc/download?doi=10.1.1.38.4657&rep=rep1&type=pdf Last visited: Apr. 28, 2010.*

"Organization of Parallel Query Processing in Multiprocessor Database Machines with Hierarchical Architecture," by Sokolinsky. IN: Journal of Programming and Computer Software (2001). Available at SpringerLink.*

"Loading Databases Using Dataflow Parallelism," by Barclay et al. IN: ACM SIGMOD (1994). Available at: ACM.*

(Continued)

*Primary Examiner*—Neveen Abel Jalil
*Assistant Examiner*—Daniel Kinsaul
(74) *Attorney, Agent, or Firm*—Sterne, Kessler, Goldstein & Fox P.L.L.C.

(57) ABSTRACT

Methods, systems, and apparatuses for improving performance of parallel database query plans are described. An exchange operator is positioned in a query tree. A child operator of the exchange operator is parallelized into a plurality of parallel child operators, each of the parallel child operators coupled to the exchange operator in a respective branch of a plurality of parallel branches of the query tree. An output of each of the plurality of parallel child operators may be buffered at the exchange operator. Furthermore, child operators of the plurality of parallel child operators may also be parallelized. Query plans of any form and containing any number of operators may be parallelized in this manner. Any number of parallel branches may be used, independent of the number of operators in the original plan. The parallelized query plans achieve effective load balancing across all branches.

28 Claims, 21 Drawing Sheets

OTHER PUBLICATIONS

"Optimization of Parallel Query Execution Plans in XPRS," by Hong and Stonebraker. IN: Distributed and Parallel Databases, vol. 1, No. 1, pp. 9-32 (1993). Available at: SpringerLink.*

DeWitt, David J. and Gray, Jim, "Parallel Database Systems: The Future of High Performance Database Processing," Jan. 1992, (appeared in Communication of the ACM, vol. 36, No. 6, Jun. 1992) pp. 1-26.

Graefe, Goetz, "acm computing surveys: Query Evaluation Techniques for Large Databases", acm Press, vol. 25, No. 2, Jun. 1993, pp. 73-170.

Graefe, Goetz, "Volcano—An Extensible and Parallel Query Evaluation System", IEEE Transactions on Knowledge and Data Engineering, vol. 6, No. 1, Feb. 1994, pp. 120-135.

Graefe, Goetz, "Encapsulation of Parallelism in the Volcano Query Processing System", Proceedings of the 1990 ACM SIGMOD International Conference on Management of Data, May 23-25, 1990; pp. 102-111.

Graefe, Goetz and Davison, Diane L., "Encapsulation of Parallelism and Architecture-Independence in Extensible Database Query Execution", IEEE Transactions on Software Engineering, vol. 19, No. 8, Aug. 1993, pp. 749-764.

* cited by examiner

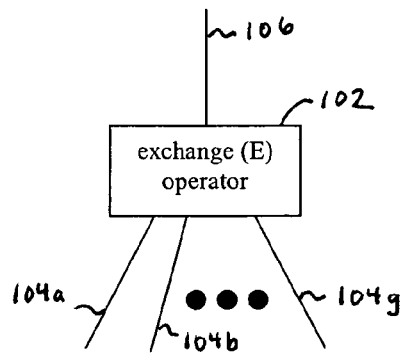
FIG. 1
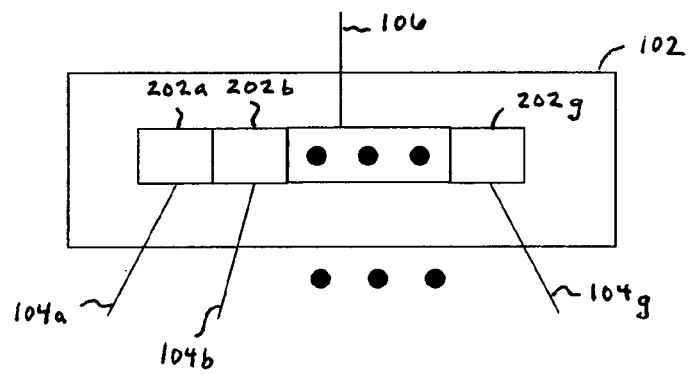
FIG. 2
| 302 |
| --- |
| an output of each of a plurality of branches of a data flow tree are buffered at the exchange operator |
FIG. 3 all rows received on an inner input are scanned for each row received on an outer input to determine matching rows /1302

LOAD BALANCING FOR COMPLEX DATABASE QUERY PLANS

BACKGROUND OF THE INVENTION

1. Field of the Invention

The present invention relates to databases, and more particularly, to algorithms for more efficiently processing database queries using parallelism.

2. Background Art

Parallel database systems improve query performance by using multiple processors and storage devices. They choose and execute query plans specially constructed to utilize parallel resources. For example, the "volcano" query processing system uses various data flow operators in query plans that are organized as trees. See Graefe, Goetz, "Encapsulation of Parallelism in the Volcano Query Processing System," SIGMOD Conference (1990), pp. 102-111. Each operator in a volcano query tree has the same interface. Thus, an operator in a node of a tree does not need to know anything about its parent or child nodes. Parallel plans in volcano are simply trees that contain special parallel operators. The "exchange" operator is one example. It acts as a boundary between threads or processes, handles the startup of these threads or processes, and buffers rows as they are passed between the threads or processes.

The volcano model is a framework for implementing parallel query evaluation in databases. It does not address the issue of how to generate parallel query plans for particular queries. There are many different ways to design parallel operators, and many different ways to construct plans that use these operators. Given a query and a set of parallel operators, it is difficult to generate a parallel query plan that makes effective use of multiple processors or disks. Thus, what is needed are ways of more easily generating parallel query plans that improve query performance.

One difficulty with constructing parallel query plans is arranging for all available processors to remain busy throughout the execution of the query. See S. Manegold, J. Obermaier, and F. Waas, "Load Balanced Query Evaluation in Shared-Everything Environments", European Conference on Parallel Processing, pp. 1117-1124, 1997, for one solution to this. The described solution applies to a plan containing only one type of operator (hash join), organized into a specific type of tree (right deep). It also only applies to one execution phase of the hash join (the probe phase). What is needed is a method for obtaining the load balancing benefits of this approach with more operator types, when these operators are organized into arbitrary tree configurations.

BRIEF SUMMARY OF THE INVENTION

Methods, systems, and apparatuses for generating complex parallel query plans with load balancing characteristics are provided. Database query plans are trees of operators. In aspects of the present invention, the query trees are parallelized by parallelizing operators of the tree, and creating one or more additional branches to the tree.

For instance, in an aspect of the present invention, an exchange operator is positioned in a query tree. A child operator of the exchange operator is parallelized into a plurality of parallel child operators. Each of the parallel child operators is coupled to the exchange operator in a respective branch of a plurality of parallel branches of the query tree. An output of each of the plurality of parallel child operators is buffered at the exchange operator. Child operators of the plurality of parallel child operators may also be parallelized. Query plans of any form and containing any number of operators may be parallelized in this manner.

Many types of operators may be parallelized according to aspects of the present invention. For example, a hash join operator can be parallelized. The first input of the hash join operator is partitioned into a plurality of first inputs. A plurality of hash tables is generated, including generating a hash table for data received on each of the plurality of first inputs. The hash tables of the plurality of hash tables are merged into a combined hash table. Each of the plurality of hash join operators is configured to probe the combined hash table with a corresponding second input.

In another aspect, the operator is a bloom filter operator having a corresponding bloom filter generator operator. An input to the bloom filter generator operator is partitioned into a first plurality of inputs. An input to the bloom filter operator is partitioned into a second plurality of inputs. The bloom filter generator operator is replaced with a plurality of bloom filter generator operators. Each of the plurality of bloom filter generator operators is configured to receive a respective one of the first plurality of inputs and to operate on a common bit array. The bloom filter operator is replaced with a plurality of bloom filter operators. Each of the plurality of bloom filter operators is configured to receive a respective one of the second plurality of inputs and to compare a generated array of positions with the common bit array.

In another aspect, the operator is a predicate filter operator. An input to the predicate filter operator is partitioned into a plurality of inputs. The predicate filter operator is replaced with a plurality of predicate filter operators. Each of the plurality of predicate filter operators is configured to receive a respective one of the plurality of inputs.

In another aspect, the operator is a nested loop join operator having a first input and a second input. The first input to the nested loop join operator is partitioned into a plurality of first inputs. The nested loop join operator is replaced with a plurality of nested loop join operators. Each of the plurality of nested loop join operators is configured to receive a respective one of the plurality of first inputs and to receive the second input.

In another aspect, the operator is a left outer join or semi join executed as a hash join or nested loop join. The join operator has a first input and a second input. The first input to the join operator is partitioned into a plurality of first inputs. If using a hash join, then the second input to the join operator is partitioned into a plurality of second inputs. The join operator is replaced with a plurality of join operators. Each of the plurality of join operators is configured to receive a respective one of the plurality of first inputs and, if using a hash join, a respective one of the plurality of second inputs.

In another aspect, the operator is a hash group by operator. An input to the hash group by operator is partitioned into a plurality of inputs. The hash group by operator is replaced with a plurality of hash group by operators. Each of the plurality of hash group by operators receives a respective one of the plurality of inputs. An additional hash group by operator is positioned in the query tree. An input to the additional hash group by operator is coupled to an output of the exchange operator.

In another aspect, the operator is a scan operator. The scan operator is replaced with a plurality of scan operators. In an aspect, each of the plurality of scan operators is configured to access the pages of a common table in a first-come first-serve manner. The scan operators can execute table scans, index probes, partial index scans, or complete index scans. For index scans, leaf pages of the index are accessed in a first-come first-serve manner.

These and other features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 1-3 illustrate example block diagrams and operation of an exchange operator.

Figure 19:
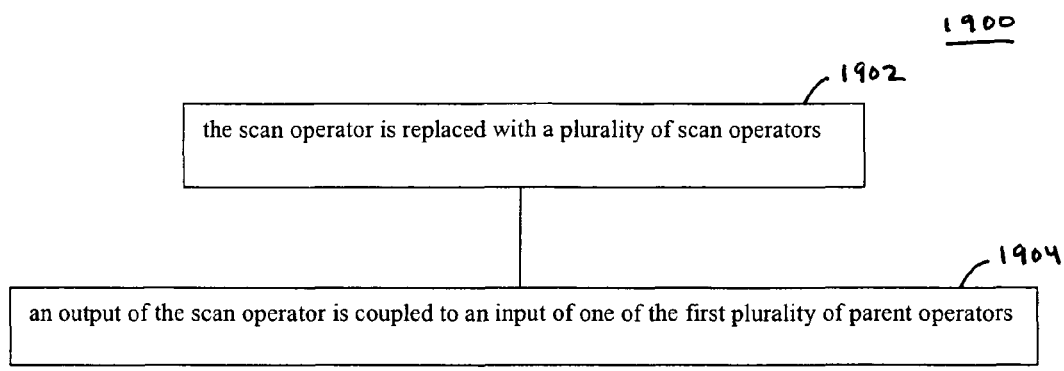
Figure 20:
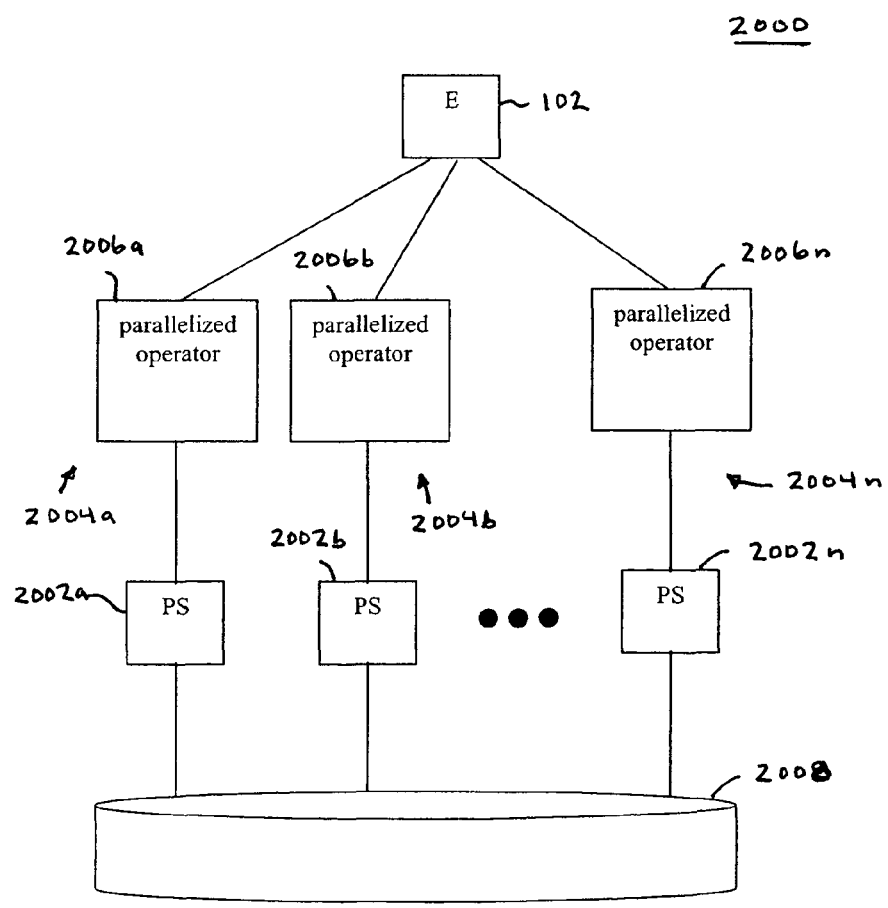

FIGS. 19 and 20 respectively show a flowchart and block diagram for a parallelized scan operator, according to an example embodiment of the present invention.

Figure 21:
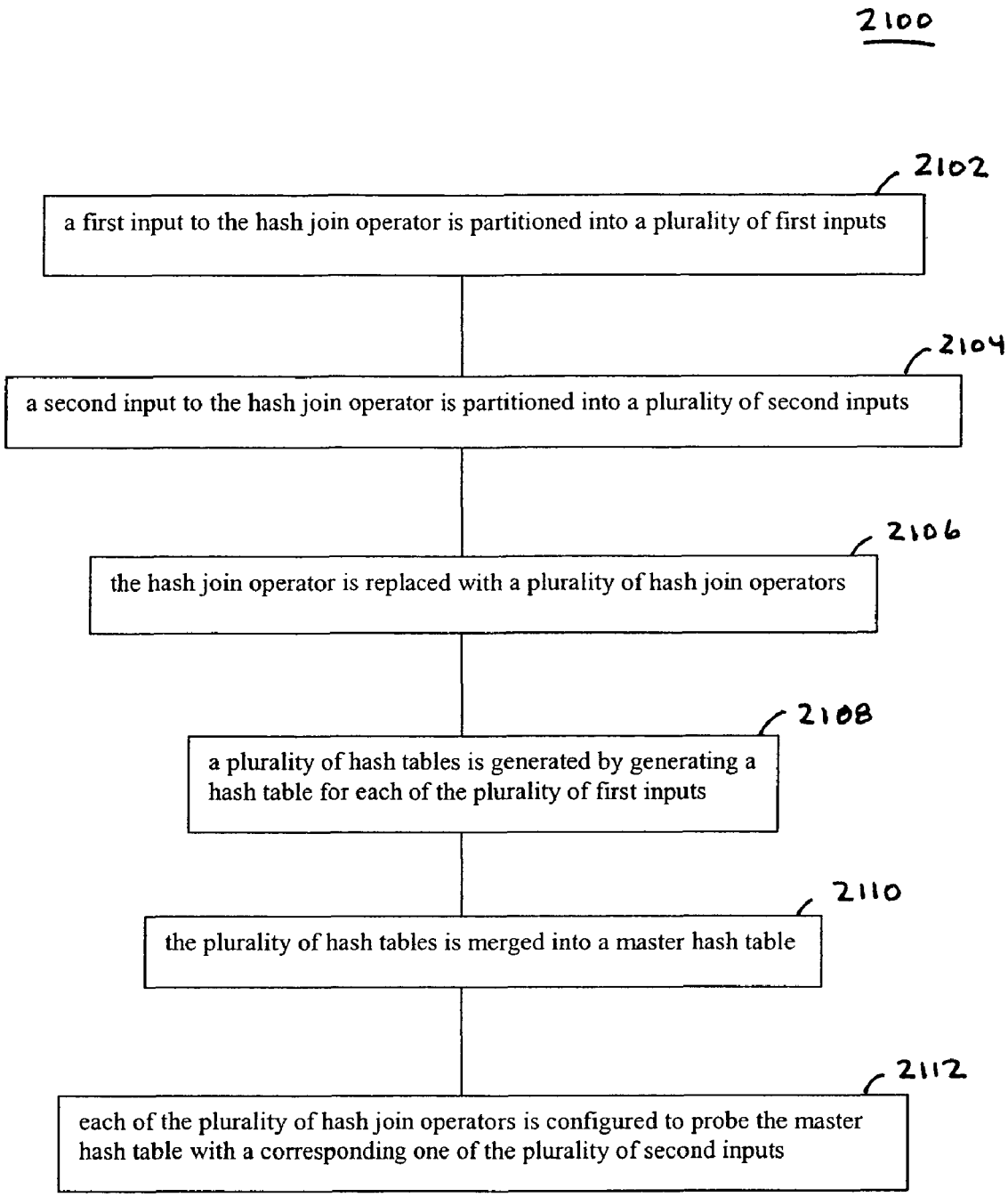
Figure 22:
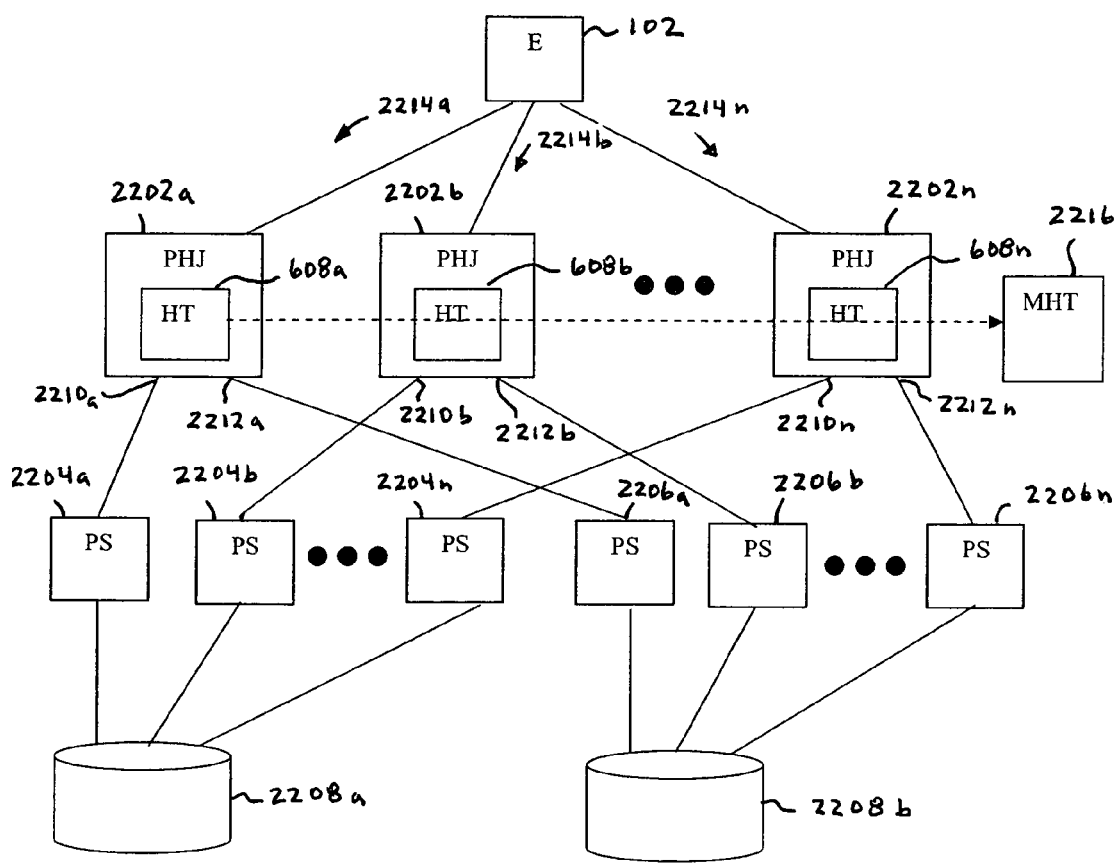

FIGS. 21 and 22 respectively show a flowchart and block diagram for a parallelized hash join operator, according to an example embodiment of the present invention.

Figure 23:
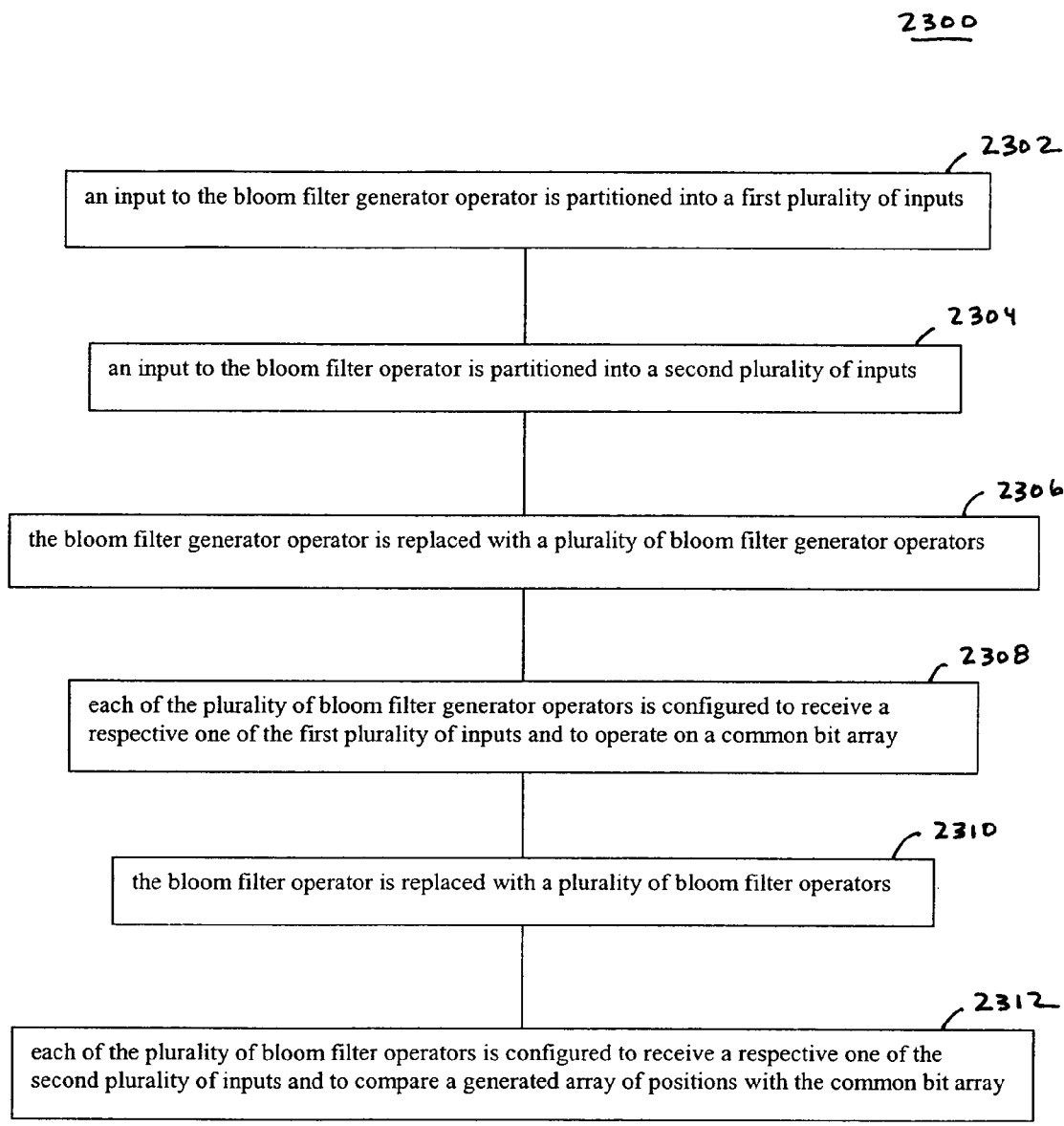

FIG. 23 shows a flowchart for parallelizing a bloom filter generator operator and bloom filter operator, according to an example embodiment of the present invention.

Figure 24:
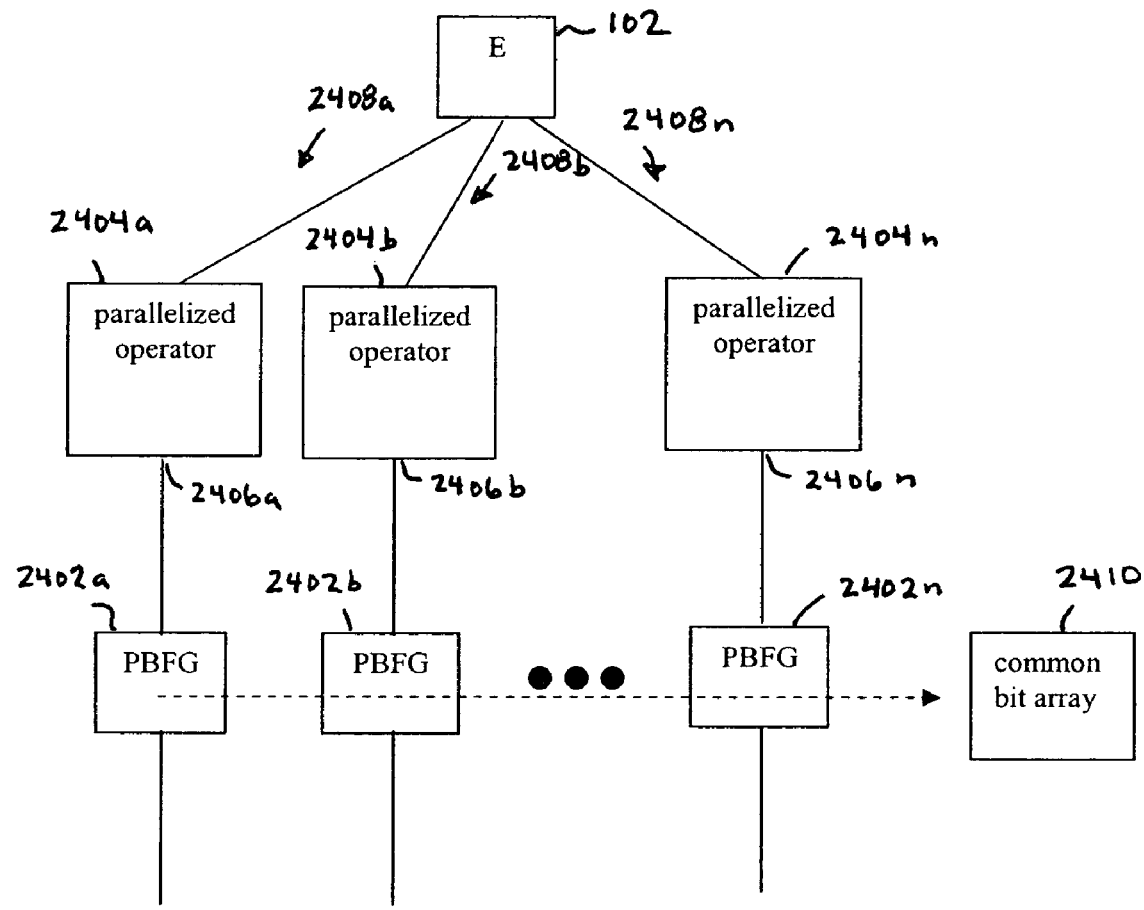
Figure 25:
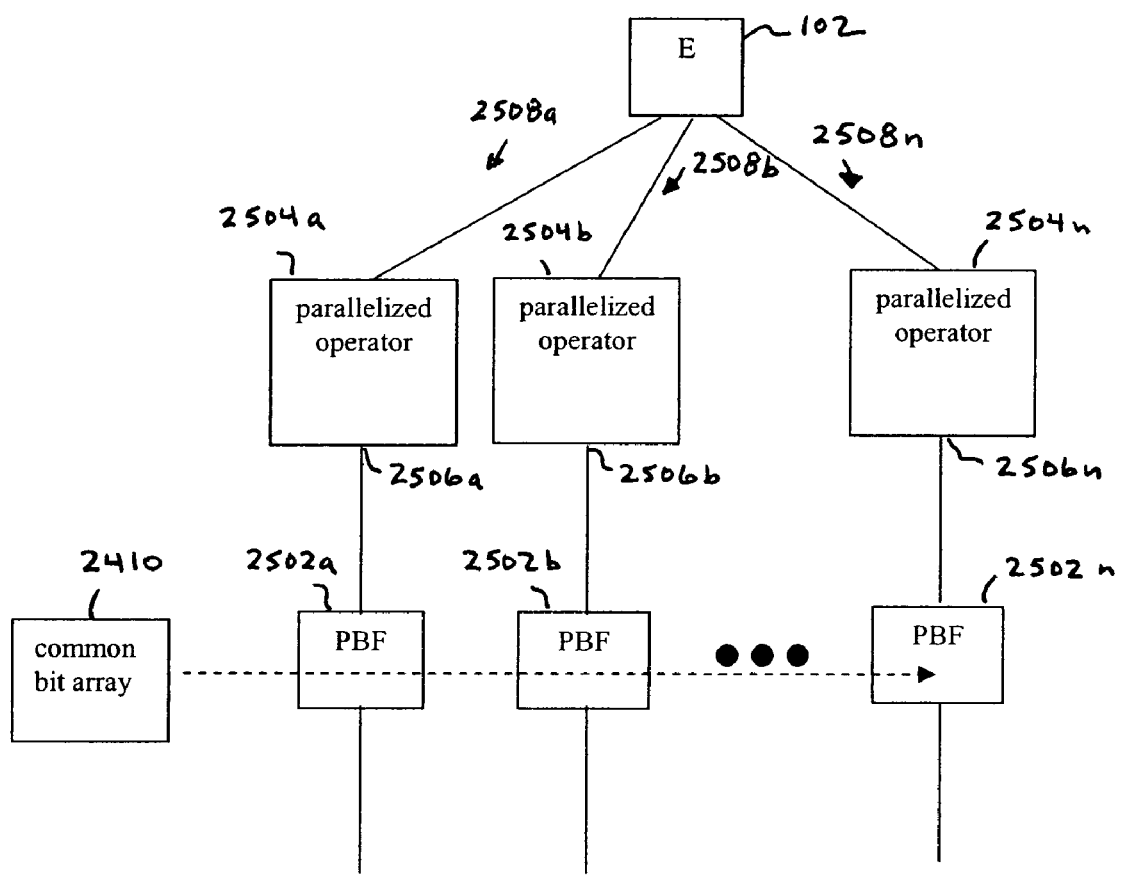

FIGS. 24 and 25 respectively show block diagrams of a parallelized bloom filter generator operator and a parallelized bloom filter, according to example embodiments of the present invention.

Figure 26:
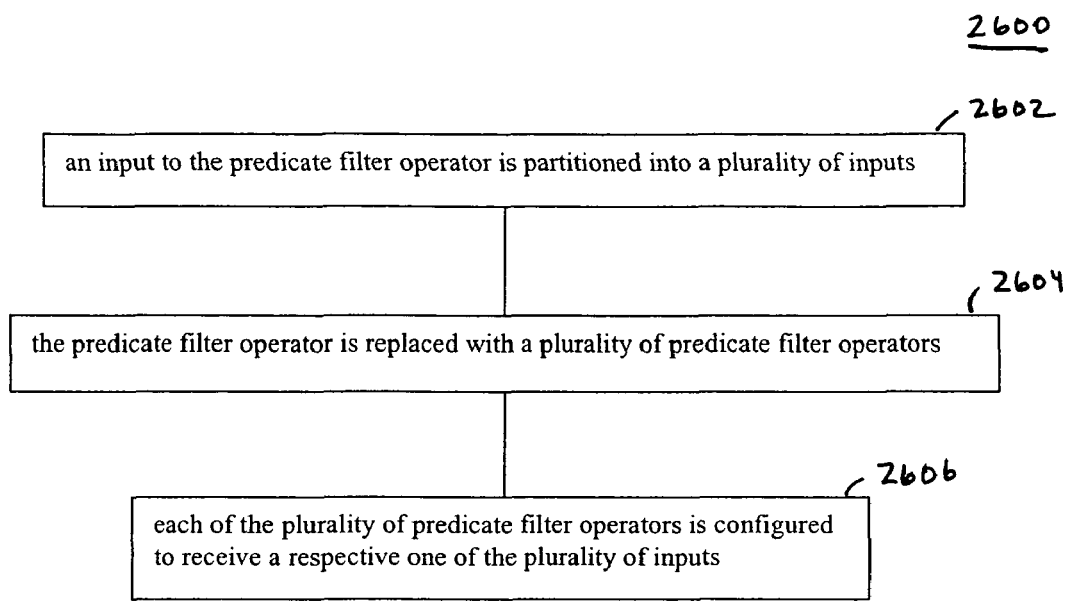
Figure 27:
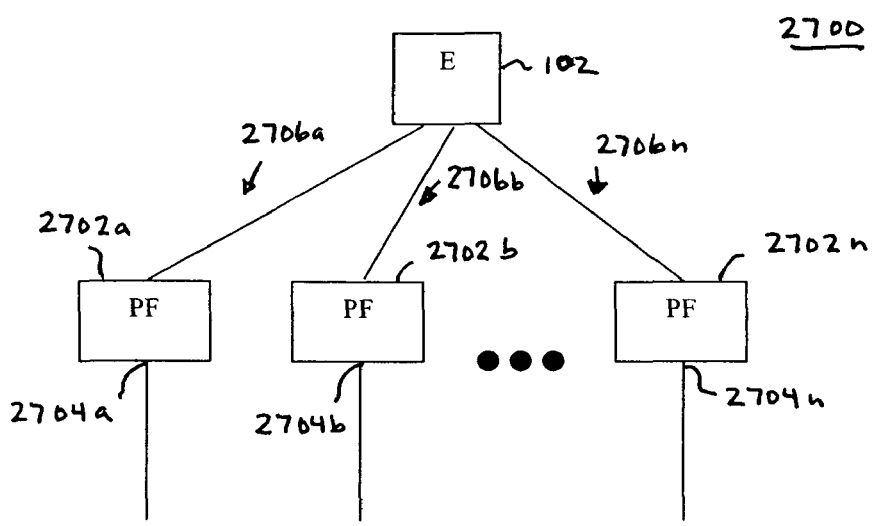

FIGS. 26 and 27 respectively show a flowchart and block diagram for a parallelized predicate filter operator, according to an example embodiment of the present invention.

Figure 28:
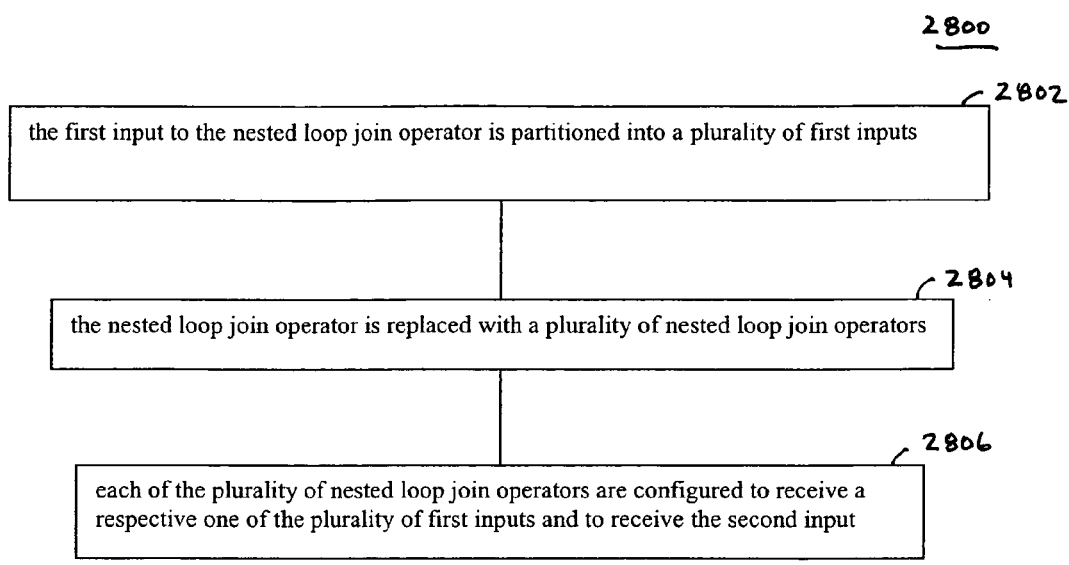
Figure 29:
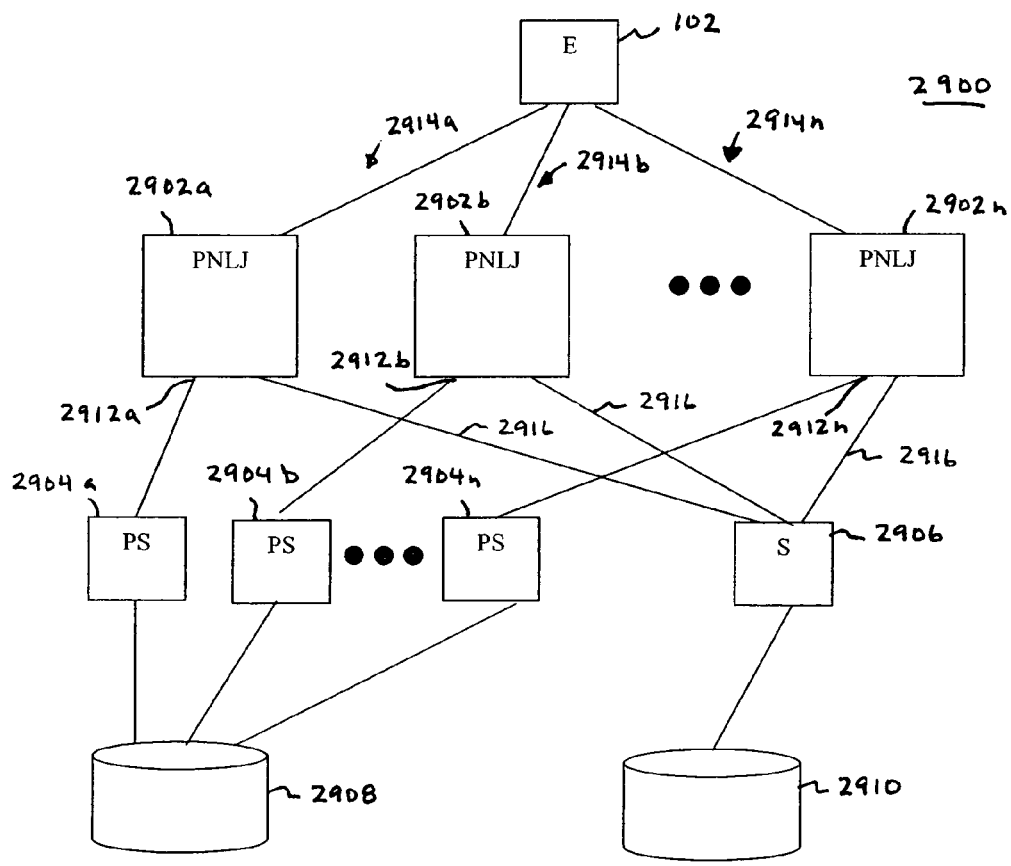

FIGS. 28 and 29 respectively show a flowchart and block diagram for a parallelized nested loop join operator, according to an example embodiment of the present invention.

Figure 30:
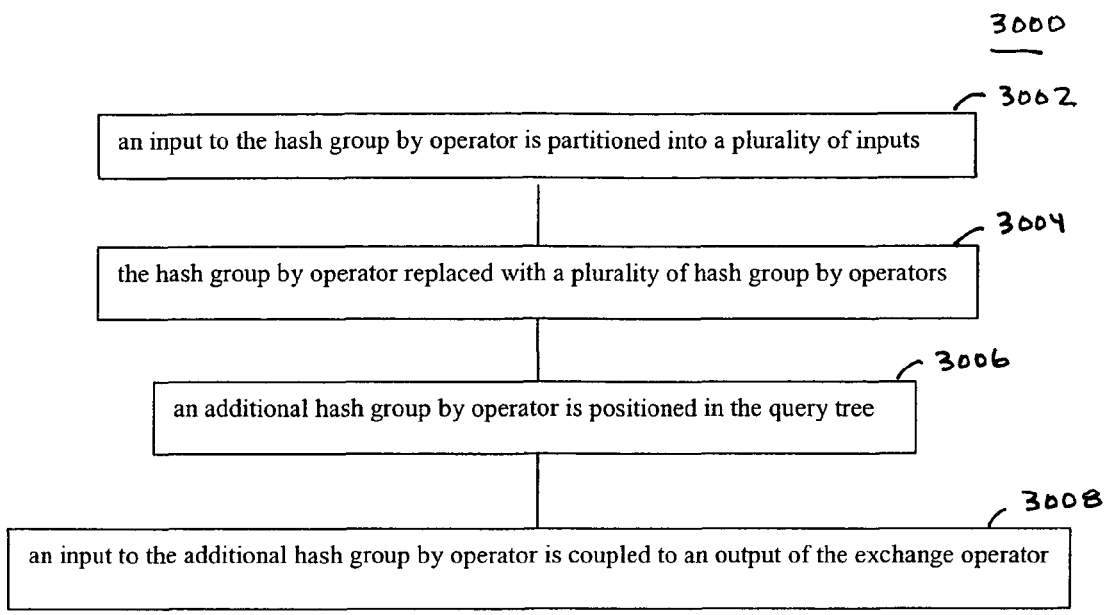
Figure 31:
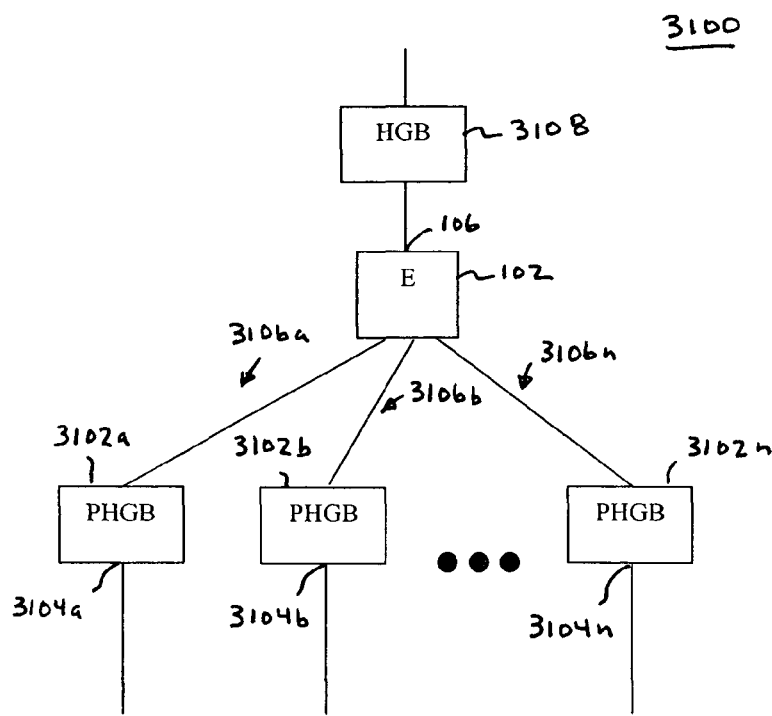

FIGS. 30 and 31 respectively show a flowchart and block diagram for a parallelized hash group by operator, according to an example embodiment of the present invention.

Figure 16:
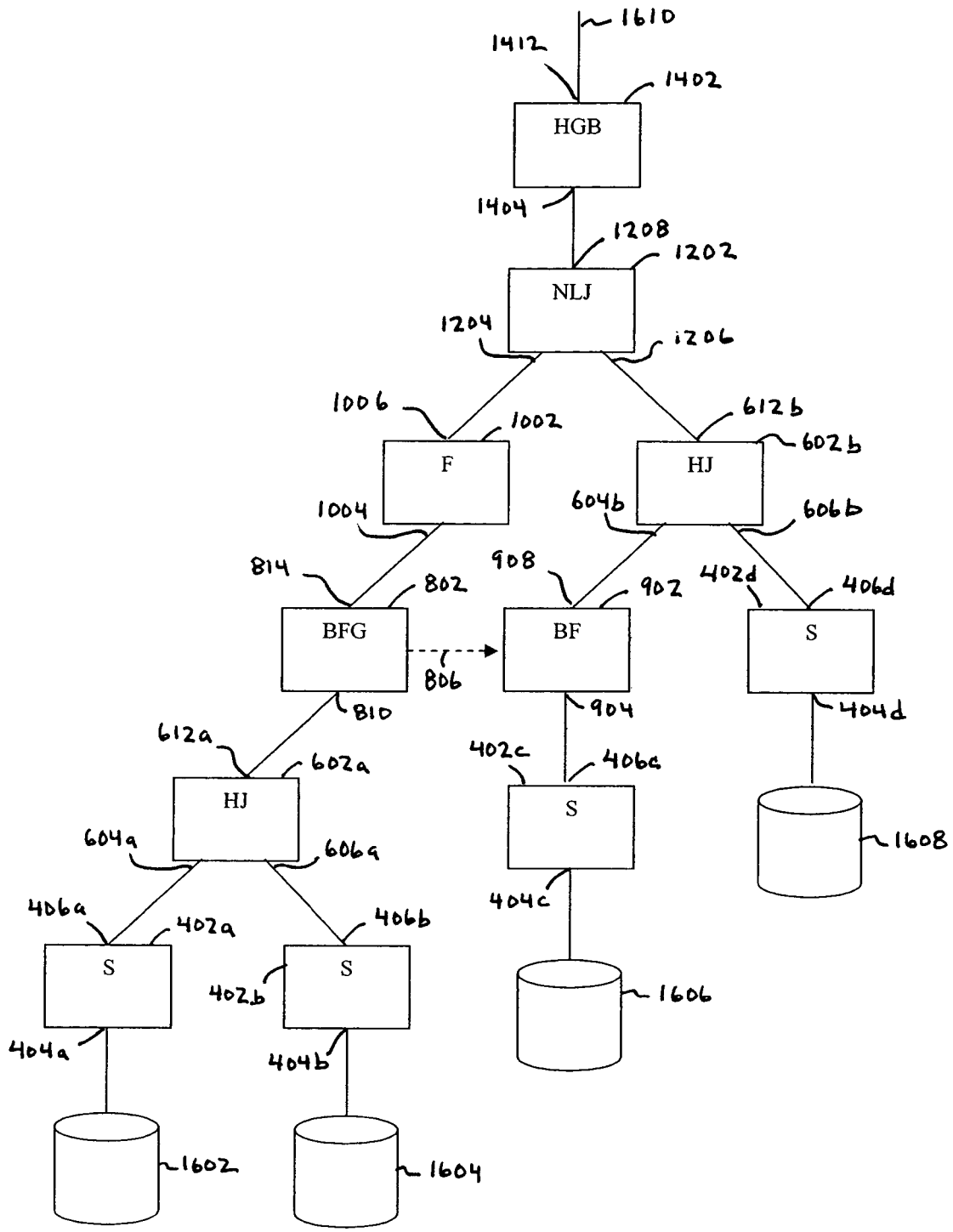
FIG. 16 shows an example query plan consisting of a tree of operators.
Figure 32:
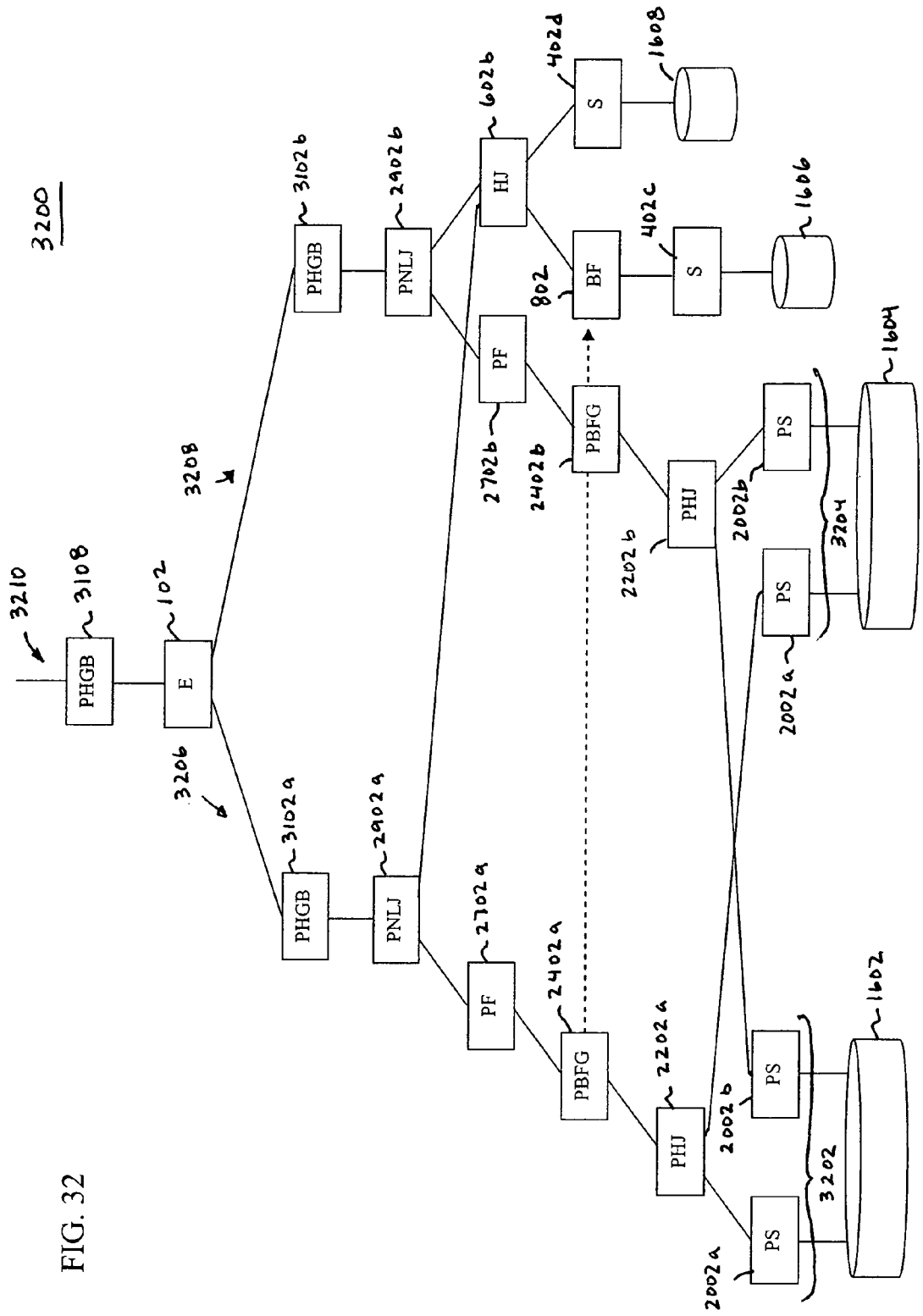

FIG. 32 shows a block diagram of the query plan of FIG. 16 after parallelization according to an example embodiment of the present invention.

Figure 33:
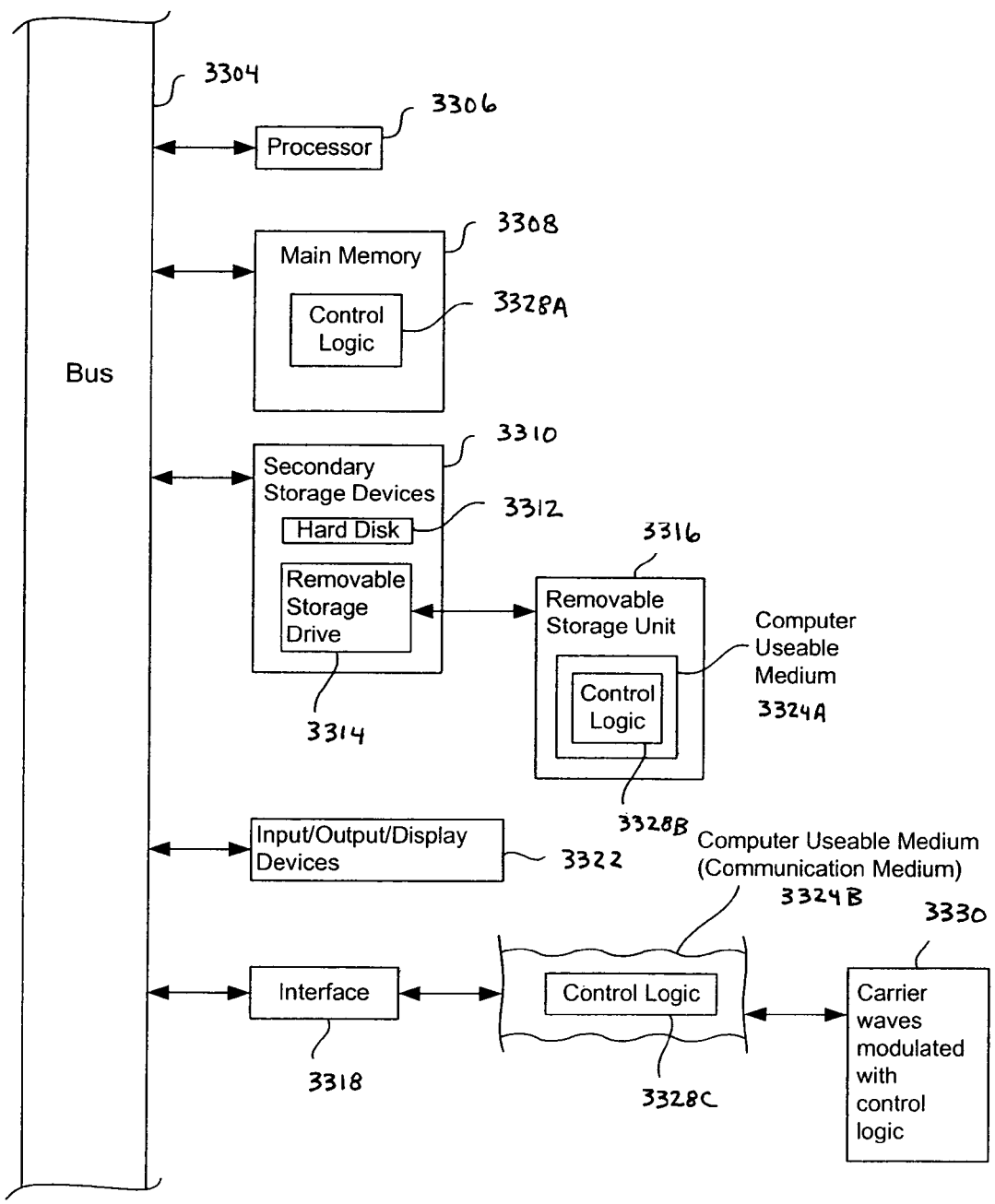

FIG. 33 is a block diagram of an example computer useful for implementing components of the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

Example Database Query Algorithms and Operators

Database query algorithms include the use of data flow operators. A particular database query plan is organized as a tree of such operators. Each operator implements a different physical algorithm. Example operators include "hash join," "hash group by," and "table scan." Typically, each operator has the same interface: open, next, and close. Because each operator has the same interface, an operator in a node of a tree does not need to know anything about the operators located at its parent or child nodes. Many such operators are known to persons skilled in the relevant art(s). Several well known operators are described below for illustrative purposes. For purposes of brevity, further data flow operators are not described. The data flow operators described below, and further data flow operators that would be known to persons skilled in the relevant art(s), are applicable to being parallelized according to embodiments of the present invention. The operators may be implemented in hardware, software, firmware, or any combination thereof. For example, in an embodiment, operators may be implemented in computer code executed by a processor.

Exchange operator: FIG. 1 shows an exchange (E) operator 102. Exchange operator 102 receives one or more inputs 104 from child operators and produces an output 106. Multiple child operators may be present that are each located in a different branch of a data flow tree emanating from exchange operator 102. For illustrative purposes, inputs 104a, 104b, and 104g are shown received by exchange operator 102 in FIG. 1. However, in embodiments, any number of inputs 104 may be received. Exchange operator 102 may provide a buffering function for inputs 104. For example, as shown in FIG. 2, exchange operator 102 may include one or more buffers 202. In the embodiment of FIG. 2, buffers 202a, 202b, and 202g are present, corresponding to each of inputs 104a, 104b, and 104g. Buffers 202a, 202b, and 202g buffer rows of data, or data in other format, received on inputs 104a, 104b, and 104g. The contents of buffers 202 are output on output 106 as rows of data.

Thus, in one example, exchange operator 102 may be configured to perform step 302 shown in FIG. 3. In step 302, an output of each of a plurality of branches of a data flow tree are buffered at the exchange operator. For example, outputs of three branches of a data flow tree (e.g., having further operators not shown in FIG. 2) may be received on inputs 104a, 104b, and 104g, and buffered in buffers 202a, 202b, and 202g.

Figure 4:
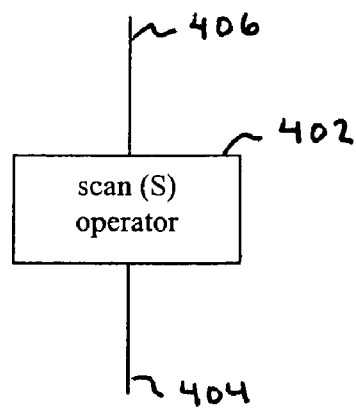
FIGS. 4 and 5 illustrate an example block diagram and example operation of a scan operator.
Figure 5:
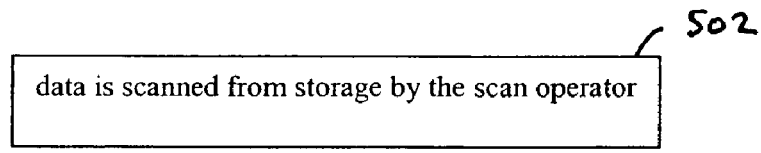

Scan operator: FIG. 4 shows a scan (S) operator 402. Scan operator 402 receives an input 404 that is a scan of data in a table. For example, a scan of a table by scan operator 402 may produce a column subset of the table, such as by scanning data from the table a page or row at a time. Scan operator 402 produces an output 406 that includes the scanned data. Thus, in one example, scan operator 402 may be configured to perform step 502 shown in FIG. 5. In step 502, data is scanned from storage by the scan operator.

Figure 6:
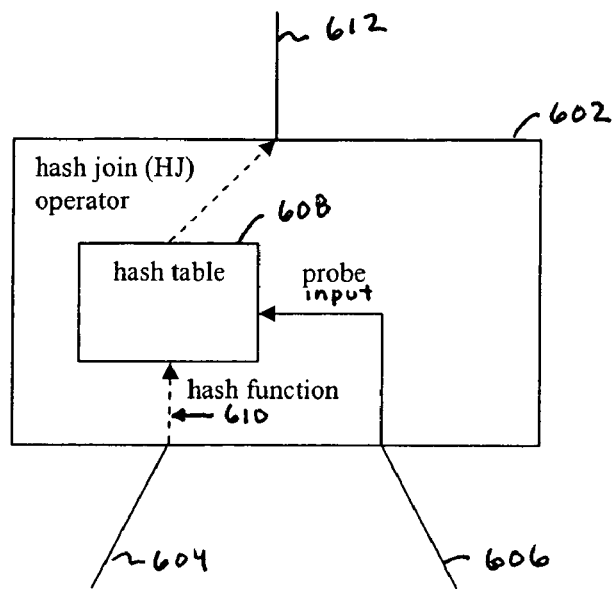
FIGS. 6 and 7 illustrate an example block diagram and example operation of a hash join operator.
Figure 7:
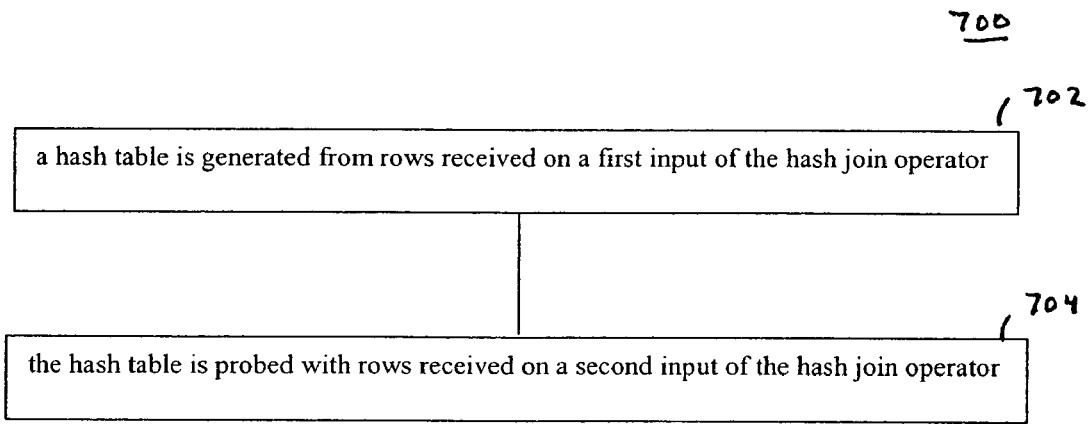

Hash join operator: FIG. 6 shows a hash join (HJ) operator 602 that performs a hash join function. Hash join operator 602 receives a first input 604 and a second input 606. First input 604 may also be referred to as a "build" input or "left" input. Second input 606 may also be referred to as a "probe" input or "right" input. Hash join operator 602 generates a hash table 608 by applying a hash function 610 to a selected join attribute of each row received on first input 604 from a child operator. Hash join operator 602 probes hash table 608 with rows received on second input 606 from another child operator. Hash join operator 602 produces an output 612 that includes the result of probing hash table 608 with second input 606. Thus, in one example, hash join operator 602 may be configured to perform flowchart 700 shown in FIG. 7. In step 702, a hash table is generated from rows received on a first input of the hash join operator. In step 704, the hash table is probed with rows received on a second input of the hash join operator. Hash join operator 602 may be configured to perform specific types of hash joins, including inner, outer, and semi-joins, as would be known to persons skilled in the relevant art(s).

Bloom filter: FIGS. 8A, 8B, 9A, and 9B relate to a bloom filtering function. In general, a bloom filter tests whether an element is a member of a set. A bloom filter allows for an amount of error. The amount of error can be controlled by varying the size of a bit array used for the bloom filter and by varying the number of hash functions. An empty bloom filter is an array of "m" bits, all set to 0. "k" different hash functions are defined, each of which maps a key value to one of the "m" array positions. An element is added to the bloom filter by a bloom filter generator, which feeds the element to each of the "k" hash functions to generate "k" array positions. The bits at the "k" positions of the "m" bit array are set to 1 by the bloom filter generator. The bloom filter queries whether an element (e.g., a row of data) is in the set by inputting the element to each of the "k" hash functions to generate "k" array positions for the element. If any of the bits of the "k" array positions in the "m" bit array are 0, the element is not in the set. If all of the bits of the "k" array are 1, then the element is either in the set or the bits have been set to 1 during the insertion of other elements.

Figure 8A:
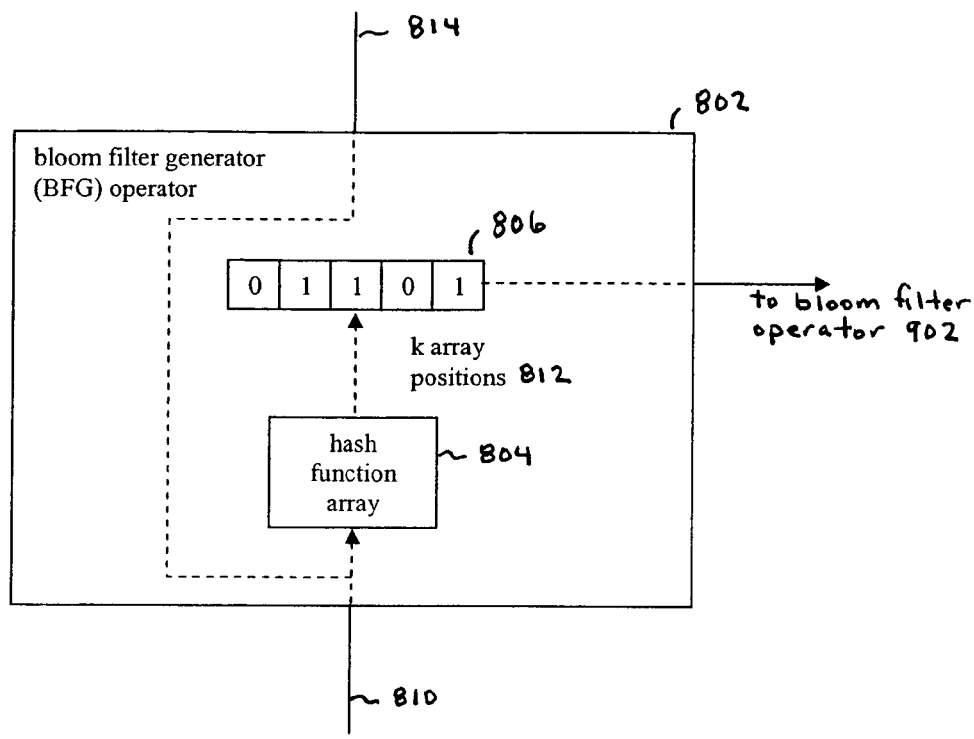
FIGS. 8A and 8B illustrate an example block diagram and example operation of a bloom filter generator operator.
Figure 8B:
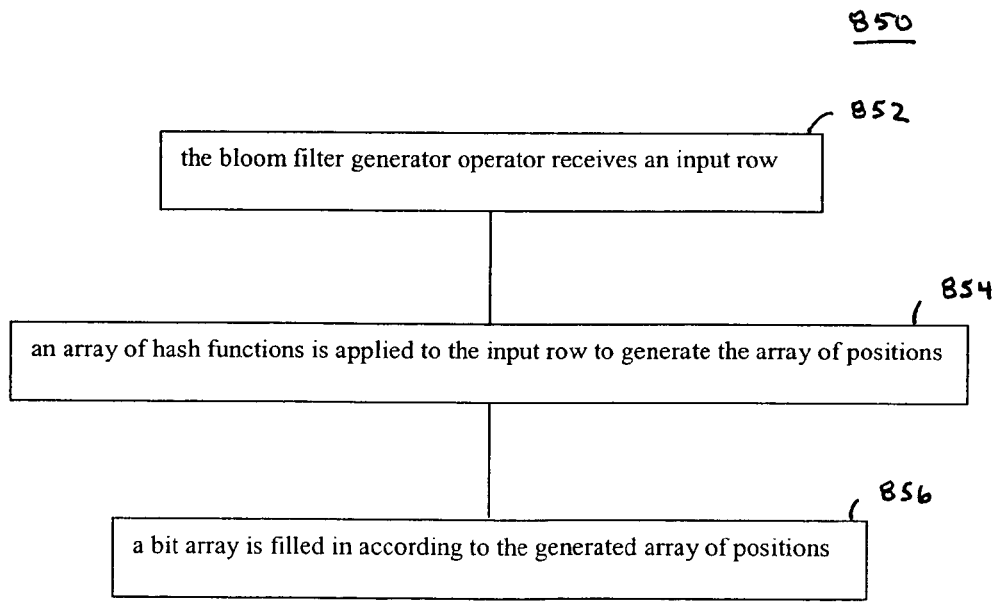

FIG. 8A shows a bloom filter generator operator 802, which performs a bloom filter generating operation, adding elements to a bloom filter. As shown in FIG. 8A, bloom filter generator operator 802 includes a hash function array 804 of "k" hash functions and an "m" bit array 806. In an example, bloom filter generator operator 802 may be configured to perform flowchart 850 shown in FIG. 8B. In step 852 of flowchart 850, the bloom filter generator operator receives an input row. For example, as shown in FIG. 8A, bloom filter generator operator 802 receives a row of data on an input 810. In step 854 shown in FIG. 8B, the array of hash functions is applied to the input row to generate an array of positions. For example, as shown in FIG. 8A, the hash function array 804 is applied to the row received on input 810 to generate an array of positions 812. In the current example, array of positions 812 includes bit positions 0, 2, and 3. In step 856, a bit array is filled in according to the generated array of positions. As shown in FIG. 8A, in the current example, "m" bit array 806, which was previously empty ("00000") is filled with bits at bit positions 0, 2, and 3, resulting with a bit pattern of 01101. Note that flowchart 850 is repeated for every input row, updating bit array 806 each time. Bloom filter generator operator 802 generates an output 814 that includes the elements received on input 810. Furthermore, access to bit array 806 is provided to a bloom filter operator 902, described as follows, which is used to query the bloom filter.

Figure 9A:
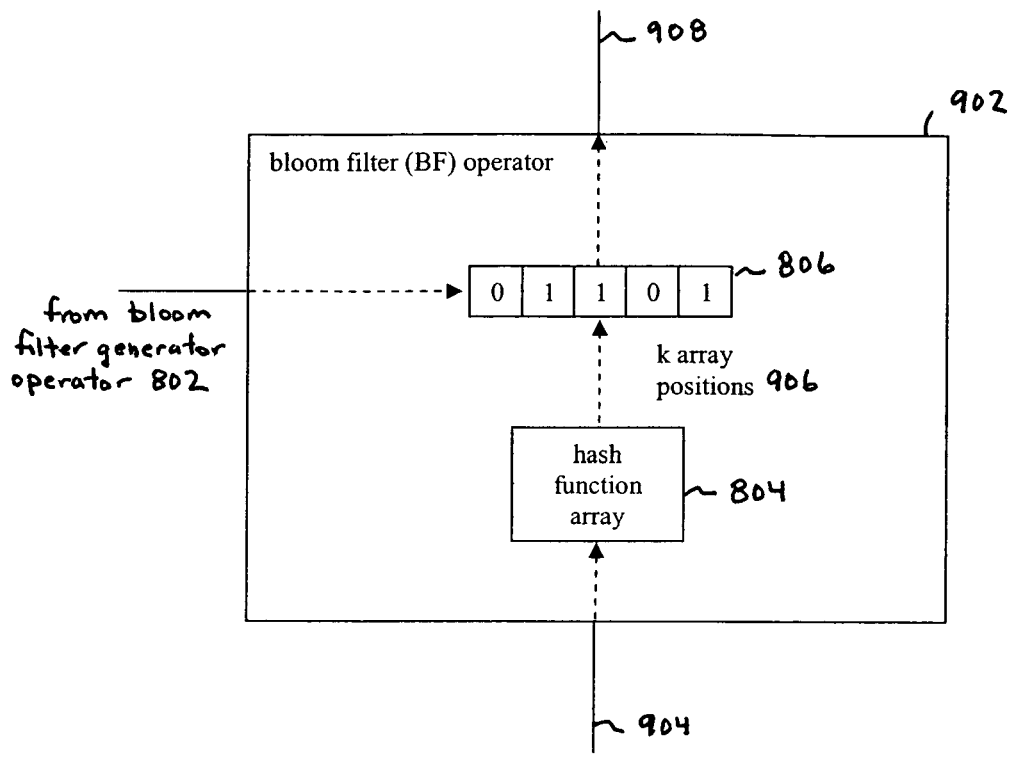
FIGS. 9A and 9B illustrate an example block diagram and example operation of a bloom filter operator.
Figure 9B:
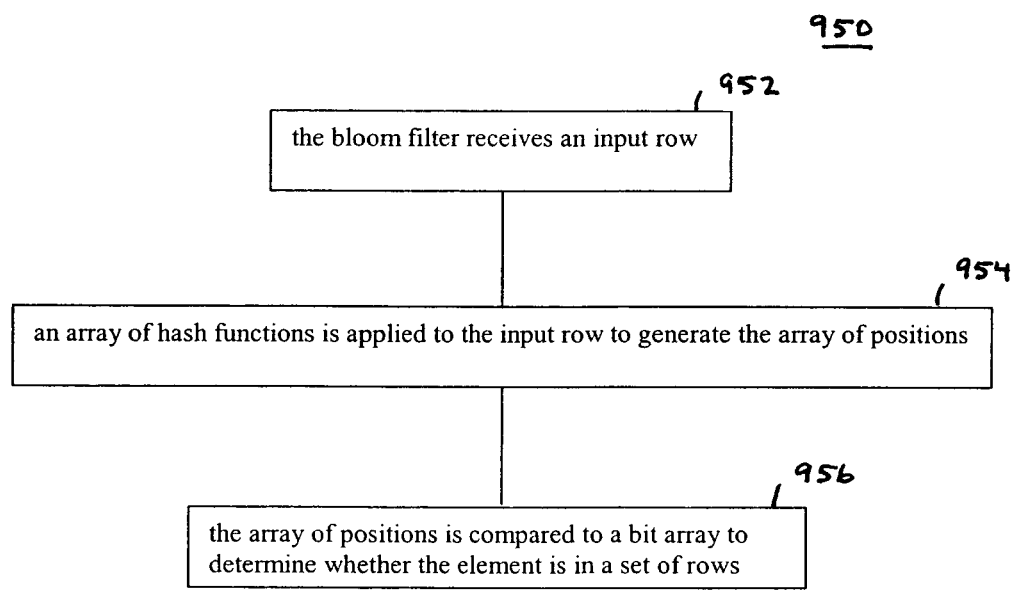

FIG. 9A shows a bloom filter operator 902, which performs a bloom filtering operation. A shown in FIG. 9A, bloom filter operator 902 includes hash function array 804 and bit array 806. Bloom filter operator 902 receives bit array 806 from bloom filter generator 802 (bit array 806 is shown filled with the "m" length bit pattern "01101", continuing the current example). In an example, bloom filter operator 902 may be configured to perform flowchart 950 shown in FIG. 9B. In step 952, the bloom filter receives an input. For example, as shown in FIG. 9A, bloom filter operator 902 receives an input 904, which is a row of data. In step 954 shown in FIG. 9B, an array of hash functions is applied to the input to generate an array of positions. For example, as shown in FIG. 9A, hash function array 804 is applied to input 904 to generate "k" array positions 906. In step 956 shown in FIG. 9B, the array of positions is compared to a bit array to determine whether the row may be in the set of rows received on input 810 used to generate the bloom filter. For example, as shown in FIG. 9A, the generated "k" array positions 906 are compared to the respective positions in bit array 806 to determine whether the row is in the set. Bloom filter operator 902 generates an output 908 that includes the rows determined to be in the set.

Figure 10:
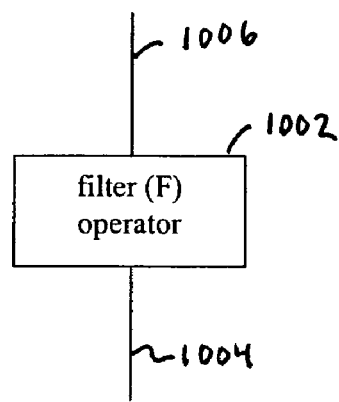
FIGS. 10 and 11 illustrate an example block diagram and example operation of a filter operator.
Figure 11:
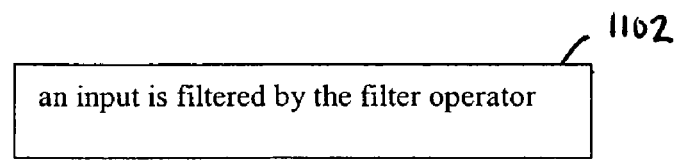

Predicate filter: FIG. 10 shows a predicate filter (F) operator 1002, which may also be referred to as a filter operator. Filter 1002 performs a predicate filtering function. Filter operator 1002 receives an input 1004, which includes rows of data from a child operator in the query tree. Filter operator 1002 applies a predicate function to input 1004, to filter the contents of input 1004. Filter operator 1002 produces an output 1006 that includes the filtered contents. Thus, filter operator 1002 may be configured to perform step 1102 shown in FIG. 11. In step 1102, an input is filtered by the filter operator.

Figures 12, 13:
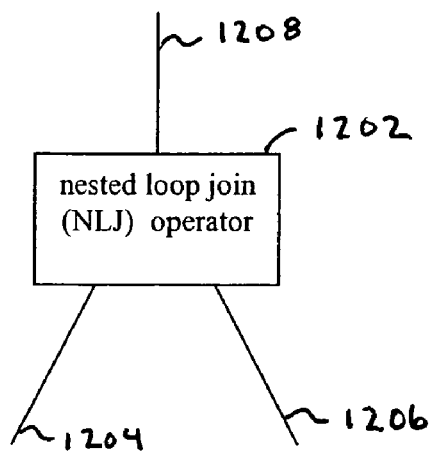
FIGS. 12 and 13 illustrate an example block diagram and example operation of a nested loop join operator.

Nested loop join: FIG. 12 shows a nested loop join (NLJ) operator 1202 that performs a nested loop join function. Nested loop join operator 1202 receives a first input 1204 and a second input 1206. First input 1204 may also be referred to as an "outer" input or "left" input. Second input 1206 may also be referred to as an "inner" input or "right" input. For each row received on first input 1204, the entirety of data received on second input 1206 is scanned for matches. Thus, in one example, nested loop join operator 1202 may be configured to perform step 1302 shown in FIG. 13. In step 1302, all rows received on an inner input are scanned for each row received on an outer input to determine matching rows. Nested loop join operator 1202 produces an output 1208, which includes a set of the matched rows. Nested loop join operator 1202 may be configured to perform specific types of joins, including inner, outer, and semi-joins, as would be known to persons skilled in the relevant art(s).

Figure 14:
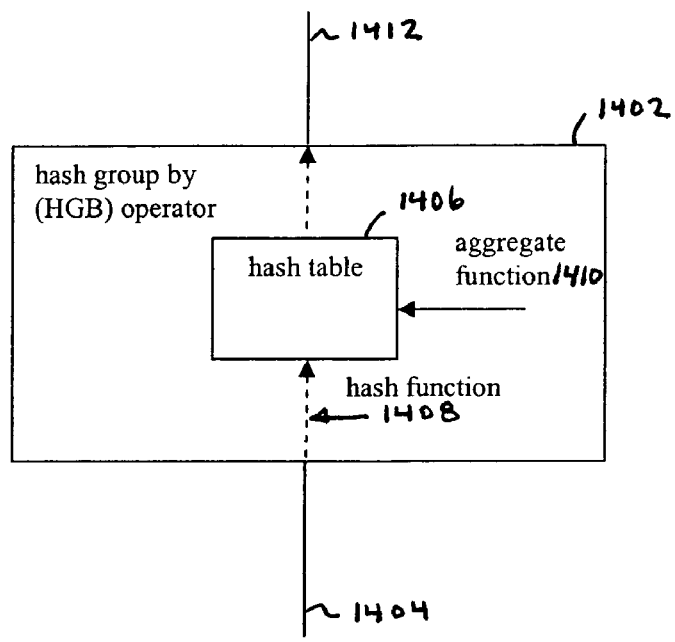
FIGS. 14 and 15 illustrate an example block diagram and example operation of a hash group by operator.
Figure 15:
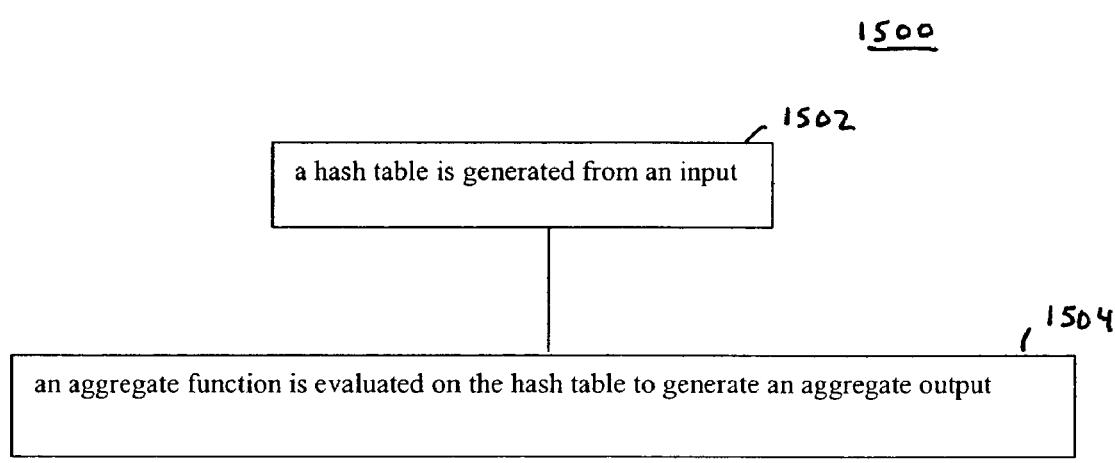

Hash group by: A group by operator returns a set that is grouped by one or more columns, to apply an aggregate function to certain columns. A hash group by operator uses a hash function on the grouping attributes. Items of the same group are found and aggregated when inserted into a hash table. FIG. 14 shows a hash group by (HGB) operator 1402. Hash group by operator 1402 receives an input 1404. Hash group by operator 1402 generates a hash table 1406 by applying a hash function 1408 to the grouping column(s) of each row received on input 1404. Hash group by operator 1402 evaluates an aggregate function 1410 on rows in hash table 1406. Aggregate function 1410 is evaluated over columns of hash table 1406 according to an argument of aggregate function 1410. Hash group by operator 1402 produces an output 1412 that includes the result of using aggregate function 1410 on hash table 1406. Thus, in one example, hash group by operator 1402 may be configured to perform flowchart 1500 shown in FIG. 15. In step 1502, a hash table is generated from an input. In step 1504, an aggregate function is evaluated on the hash table to generate an aggregated output.

The operators described above can be combined in a database query plan tree to be used to query a table. For illustrative purposes, FIG. 16 shows an example query plan 1600, in tree form. In FIG. 16, an operator positioned below relative to another (upper) operator is considered a child operator of the upper operator. An operator shown above another operator is considered a parent operator to the other operator. As shown in FIG. 16, query plan 1600 includes a hash group by operator 1402, a nested loop join operator 1202, a filter operator 1002, a bloom filter generator operator 802, a bloom filter operator 902, a first hash join operator 602a, a first scan operator 402a, a second scan operator 402b, a second hash join operator 602b, a third scan operator 402c, and a fourth scan operator 402d. Operation of query plan 1600 is described as follows, to illustrate example operation of a query plan.

At the bottom of query plan 1600, scan operators 402a-402d each scan a respective one of tables 1602, 1604, 1606, and 1608. For example, scan operators 402a-402d may each scan a page, or other quantity, of data at a time from their respective table.

A first input 604a of first hash join operator 602a is coupled to an output 406a of first scan operator 402a. A second input 606a of first hash join operator 602a is coupled to an output 406b of second scan operator 402b. First hash join operator 602a performs a hash join function on first and second inputs 604a and 606a, which respectively include rows of data output by first and second scan operators 402a and 402b. First hash join operator 602a produces an output 612a.

An input 810 of bloom filter generator operator 802 is coupled to output 612a of first hash join operator 602a. Bloom filter generator operator 802 performs a bloom filter generating function on input 810, which includes rows of data output by first hash join operator 602a. Bloom filter generator operator 802 produces an output 814.

An input 1004 of filter operator 1002 is coupled to an output 814 of bloom filter generator operator 802. Filter 1002 performs a predicate filtering function on input 1004, which includes rows of data output by bloom filter generator operator 802. Filter 1002 produces and output 1006.

An input 904 of bloom filter 902 is coupled to an output of third scan operator 402c. Bloom filter 902 performs a bloom filtering function on input 904, which includes rows of data output by third scan operator 402c. Bloom filter 902 produces an output 908.

A first input 604b of second hash join operator 602b is coupled to an output 908 of bloom filter 902. A second input 606b of second hash join operator 602b is coupled to an output 406d of fourth scan operator 402d. Second hash join operator 602b performs a hash join function on first and second inputs 604b and 606b, which respectively include rows of data output by bloom filter 902 and fourth scan operator 402d. Second hash join operator 602b produces an output 612b.

A first input 1204 of nested loop join operator 1202 is coupled to output 1006 of filter 1002. A second input 1206 of nested loop join operator 1202 is coupled to an output 612b of hash join operator 602b. Nested loop join operator 1202 performs a nested loop join function on first and second inputs 1204 and 1206, which respectively include rows of data output by filter operator 1002 and second hash join operator 602b. Nested loop join operator 1202 produces an output 1208.

An input 1404 of hash group by operator 1402 is coupled to output 1208 of nested loop join operator 1202. Hash group by operator 1402 performs a hash group by function on input 1404, which includes rows of data output by nested loop join operator 1202. Hash group by operator 1402 produces an output 1412 at an output 1610 of query plan 1600.

Thus, as shown in FIG. 16, query plan 1600 receives (i.e., scans) input data from tables 1602, 1604, 1606, and 1608, processes data with operators, and generates an output result (at output 1412) that is output by the top-most (root) operator (hash group by operator 1402 in FIG. 16). In query plans, input data can processed in any variety of ways by configuring a suitable number of operators into a query plan tree in corresponding ways. The operators used may include those described above and/or other operators known to persons skilled in the relevant art(s).

However, as described above, query trees are not easily modified to enable parallel processing for improved performance. Embodiments of the present invention enable query trees, such as query tree 1600 to be modified for parallel processing ("parallelized"). Embodiments involve creating additional branches, adding some operators, and changing some operators to parallel variants. Example embodiments of the present invention are described in further detail below.

Embodiments of the Present Invention

Methods, system, and apparatus are described below for parallelizing database query trees. The example embodiments described herein are provided for illustrative purposes, and are not limiting. Further structural and operational embodiments, including modifications/alterations, will become apparent to persons skilled in the relevant art(s) from the teachings herein.

Figure 17:
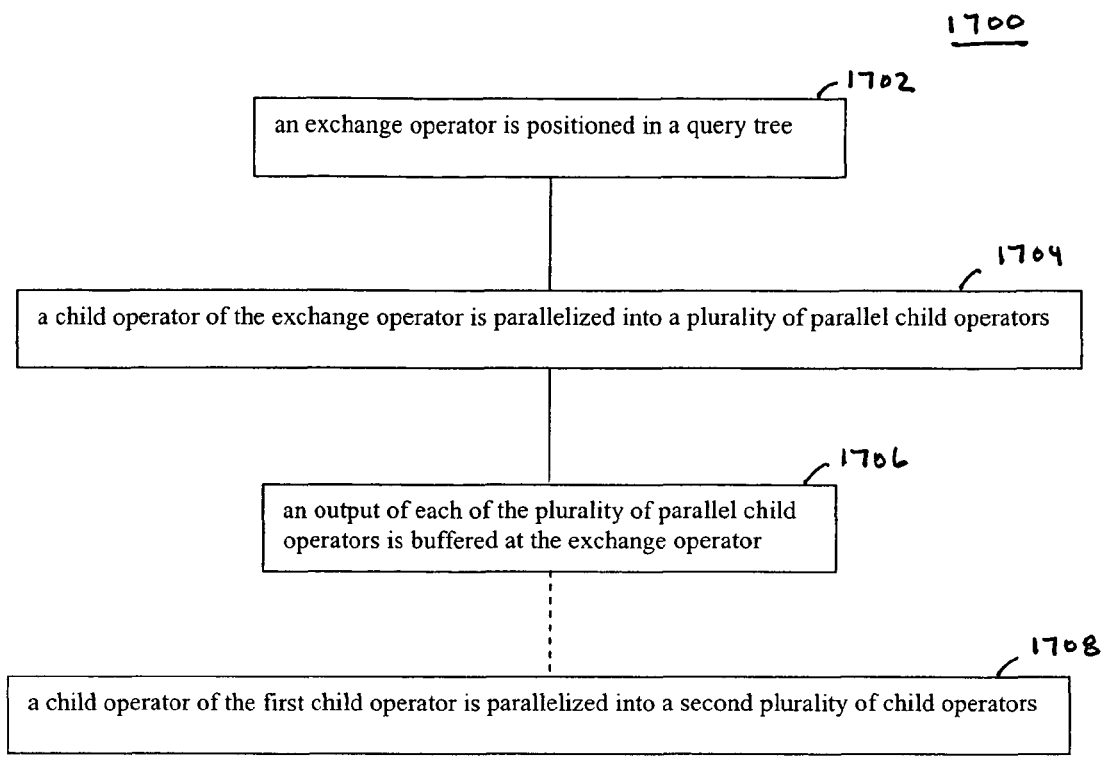
FIG. 17 shows a flowchart for parallelizing a query plan, according to an example embodiment of the present invention.

In embodiments, a query tree may be parallelized to enable faster processing. FIG. 17 shows a flowchart 1700 providing example steps for parallelizing a query tree, according to example embodiments of the present invention. The steps of flowchart 1700 do not necessarily have to occur in the order shown. Other structural and operational embodiments will be apparent to persons skilled in the relevant art(s) based on the following discussion.

Figure 18:
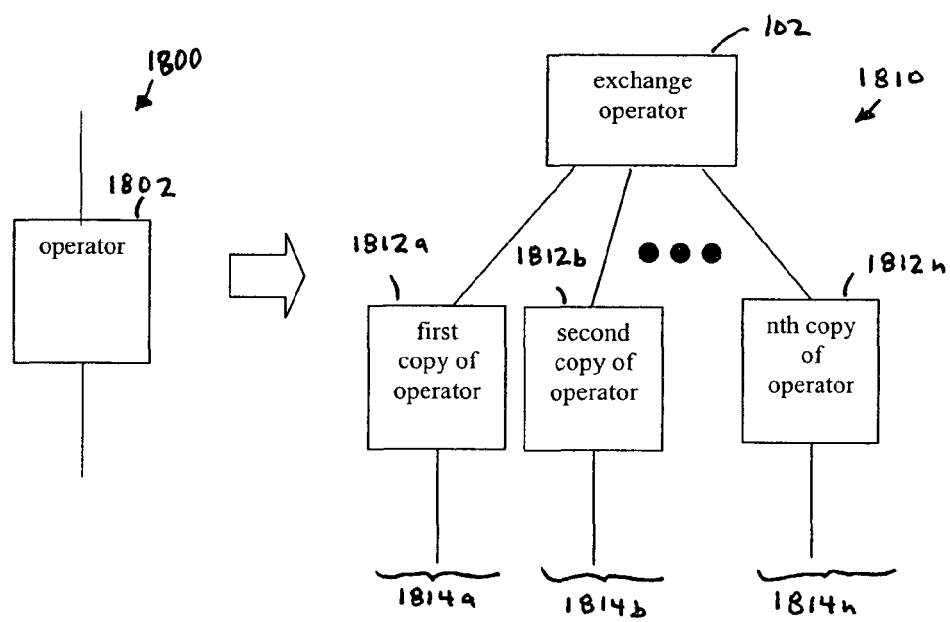
FIG. 18 shows a block diagram of parallelization of a query plan, according to an example embodiment of the present invention.

Flowchart 1700 begins with step 1702. In step 1702, an exchange operator is positioned into a query tree. For example, FIG. 18 shows a query plan 1800, according to an embodiment of the present invention. Query plan 1800 is converted into a parallelized query plan 1810 shown in FIG. 18. Non-parallelized query plan 1800 includes an operator 1802 (further operators are not shown, for purposes of brevity). Examples of operator 1802 are those operators described above with respect to FIGS. 5-15. Parallelized query plan 1810 has an exchange operator 102 positioned in the tree of query plan 1800, according to step 1702.

In step 1704, a child operator of the exchange operator is parallelized into a plurality of parallel child operators. For example, as shown in FIG. 18, operator 1802 of query plan 1800 is converted into a plurality of parallel operators 1812a-1812n in parallelized query plan 1810 of FIG. 18. Any number of parallel operators 1812 may be created, as desired for a particular application. Each of parallel operators 1812a-1812n are located in a respective parallel branch 1814a-1814n formed in the tree of parallelized query plan 1810, emanating from exchange operator 102. Examples of step 1704 are further described below.

In step 1706, an output of each of the plurality of parallel child operators is buffered at the exchange operator. For example, as shown in FIG. 2, an output of each of parallel operators 1812a-1812n may be buffered in a respective one of buffers 202 of exchange operator 102. Step 1706 may be performed when parallel operators 1812a-1812n are direct children of exchange operator 102 (e.g., no other children are between parallel operators 1812a-1812n and exchange operator 102).

Step 1708 of flowchart 1700 may be performed when operator 1802 has one or more descendant operators. In step 1708, a child operator of the first child operator is parallelized into a second plurality of child operators. Any number of descendant operators of operator 1802 (not shown in FIG. 18) may also be parallelized in parallel query plan 1810. Examples of step 1708 are further described below.

Examples of parallelization of operators according to steps 1704 and 1708 are provided below. Such parallelization may be extended to further types of operators that are not described below, as would be understood by persons skilled in the relevant art(s) from the teachings herein.

FIG. 19 shows a flowchart 1900 for parallelization of a scan operator, such as scan operator 402 shown in FIG. 4, according to an example embodiment. Flowchart 1900 is described with respect to an example query plan 2000 shown in tree form in FIG. 20. In FIG. 20, exchange operator 102 receives inputs from a plurality of parallel operators 2006a-2006n. Each of parallel operators 2006a-2006n receives a respective input from one of a plurality of parallel scan (PS) operators 2002a-2002n. In the example of FIG. 20, an operator (of unspecified type in FIG. 20) directly above scan operators 2002a-2002n was parallelized to form plurality of operators 2006a-2006n.

In step 1902 of flowchart 1900, the scan operator is replaced with a plurality of scan operators. For example, as shown in FIG. 20, scan operator 402 has been replaced with plurality of parallel scan operators 2002a-2002n. Parallel scan operators 2002a-2002n individually operate similarly to scan operator 402 of FIG. 4, but split up the work of the scan and perform it in parallel in contrast to a single scan operator 402. As shown in FIG. 19, each of scan operators 2002a-2002n is positioned in a respective branch of a plurality of parallel branches 2004a-2004n that emanate from exchange operator 102.

As shown in FIG. 20, each of plurality of scan operators 2002a-2002n is coupled to a common table 2008. In an embodiment, scan operators 2002a-2002n access pieces of table 2008 in a first-come first-serve manner. In an embodiment, scan operators 2002a-2002n each scan pages of data from table 2008 as needed, each scanning in the next page of data available when the particular scan operator 2002 makes a request. An advantage of this is that pre-partitioned data is not required. Because each scan operator scans data as needed, automatic load balancing occurs. Operators above a first scan operator are thus able to perform operations at a different rate than operators above a second scan operator. Many systems attempt to pre-partition data for load balancing purposes, which is very difficult to do accurately.

In embodiments, scan operators 2002a-2002n may be configured to perform table scans, index scans, etc. For example, for an index scan, each of scan operators 2002a-2002n may be configured to scan a leaf page of data per access of common database 2008. For a sequential table scan, an important advantage to scanning pages in a first-come first-serve manner is that the sequential access pattern to the table is preserved regardless of the number of parallel scans. This is important because sequential access is much faster than random access on disks where typical databases are stored.

FIG. 21 shows a flowchart 2100 for parallelization of a hash join operator, such as hash join operator 602 shown in FIG. 6, according to an example embodiment. Flowchart 2100 is described with respect to an example query plan 2200 shown in tree form in FIG. 22. In FIG. 22, exchange operator 102 receives inputs from a plurality of parallel hash join (PHJ) operators 2202a-2202n. Each of parallel hash join operators 2202a-2202n has a first input and a second input, and receives at the first input a respective output from one of a first plurality of parallel scan operators 2204a-2204n, and receives at the second input a respective output from one of a second plurality of parallel scan operators 2206a-2206n. In the example of FIG. 22, an original first scan operator (not shown in FIG. 22) was parallelized to form first plurality of parallel scan operators 2204a-2204n, and a second original scan operator (not shown in FIG. 22) was parallelized to form second plurality of parallel scan operators 2206a-2206n. First plurality of parallel scan operators 2204a-2204n scan data from a first common table 2208a that was previously scanned by the original first scan operator. Second plurality of parallel scan operators 2206a-2206n scan data from a second common table 2208b that was previously scanned by the original second scan operator.

In step 2102, a first input to the hash join operator is partitioned into a plurality of first inputs. For example, hash join operator 602 of FIG. 6 has first input 604, which is coupled to an output of a child operator, such as a scan operator 402. In FIG. 22, first input 604 is partitioned into a plurality of first inputs 2210a-2210n, which are each received from a respective one of parallel scan operators 2204a-2204n.

In step 2104, a second input to the hash join operator is partitioned into a plurality of second inputs. For example, hash join operator 602 of FIG. 6 has second input 606, which is coupled to an output of a child operator, such as a scan operator 402. In FIG. 22, second input 606 is partitioned into a plurality of second inputs 2212a-2212n, which are each coupled to a respective one of parallel scan operators 2206a-2206n.

In step 2106, the hash join operator is replaced with a plurality of hash join operators. For example, as shown in FIG. 22, hash join operator 602 has been replaced with a plurality of parallel hash join operators 2202a-2202n. Parallel hash join operators 2202a-2202n individually operate similarly to hash join operator 602 of FIG. 4, but together execute faster relative to a single hash join operator 602. Each of plurality of parallel hash join operators 2202a-2202n is positioned in a respective branch of a plurality of parallel branches 2214a-2214n of query plan 2200 that are children of exchange operator 102.

In step 2108, a plurality of hash tables is generated by generating a hash table for each of the plurality of first inputs. For example, as shown in FIG. 22, each of hash join operators 2202a-2202n generates a respective hash table 608a-608n based on data received on a respective one of first inputs 2210a-2210n.

In step 2110, the plurality of hash tables is merged into a combined hash table. For example, as shown in FIG. 22, hash tables 608a-608n are merged into combined hash table 2216.

In step 2112, each of the plurality of hash join operators is configured to probe the combined hash table with a corresponding one of the plurality of second inputs. For example, as shown in FIG. 22, each of hash join operators 2202a-2202n are configured to access combined hash table 2216. Each of hash join operators 2202a-2202n are configured to probe combined hash table 2216 with data received respectively on second inputs 2212a-2212n, in a similar fashion that hash join operator 602 probes hash table 608 with second input 606 in FIG. 6.

Note that hash join operators may be parallelized in right deep, left deep, and bushy tree topologies. Embodiments do not require estimating which build sides fit in memory, or finding pipelined regions. The build phase may use more processors than the original number of hash join operators if desired, and is load balanced the same as the probe phase. Specific types of hash join operators may be parallelized in the above described manner, including inner, outer, and semi-joins.

FIG. 23 shows a flowchart 2300 for parallelization of a bloom filter generator and a bloom filter, such as bloom filter generator operator 802 shown in FIG. 8A and bloom filter operator 902 shown in FIG. 9A, according to an example embodiment. Although flowchart 2300 describes parallelization of both of bloom filter generator and bloom filter operators, in an alternative embodiment, only one or the other may be parallelized (such as shown in FIG. 32, described further below).

Flowchart 2300 is described with respect to an example query plan 2400 shown in FIG. 24, and an example query plan 2500 shown in FIG. 25. In FIG. 24, exchange operator 102 receives inputs from a plurality of parallel operators 2404a-2404n. Each of parallel operators 2404a-2404n receives a respective input from one of a plurality of parallel bloom filter generator (PBFG) operators 2402a-2402n. Note that in an alternative embodiment, bloom filter generator operators 2402a-2402n may be direct children of exchange operator 102.

In FIG. 25, exchange operator 102 receives inputs from a plurality of parallel operators 2504a-2504n. Each of parallel operators 2504a-2504n receives a respective input from one of a plurality of parallel bloom filter (PBF) operators 2502a-2502n. Note that in an alternative embodiment, bloom filter operators 2502a-2502n may be direct children of exchange operator 102.

In step 2302, an input to the bloom filter generator operator is partitioned into a first plurality of inputs. For example, bloom filter generator operator 802 of FIG. 8A has an input 810, which may be coupled to an output of a child operator. In FIG. 24, input 810 is partitioned into a plurality of inputs 2406a-2406n, which are each coupled to a respective parallel parent operator.

In step 2304, an input to the bloom filter operator is partitioned into a second plurality of inputs. For example, bloom filter operator 902 of FIG. 9A has an input 904, which may be coupled to an output of a child operator. In FIG. 25, input 904 is partitioned into a plurality of inputs 2506a-2506n, which are each coupled to a respective parallel parent operator.

In step 2306, the bloom filter generator operator is replaced with a plurality of bloom filter generator operators. For example, as shown in FIG. 24, bloom filter generator operator 802 has been replaced with plurality of parallel bloom filter generator operators 2402a-2402n. Parallel bloom filter generator operators 2402a-2402n individually operate similarly to bloom filter generator operator 802 of FIG. 8A, but together execute faster relative to a single bloom filter generator operator 802. As shown in FIG. 24, each of bloom filter generator operators 2402a-2402n is positioned in a respective branch of a plurality of parallel branches 2408a-2408n that are children of exchange operator 102.

In step 2308, each of the plurality of bloom filter generator operators is configured to receive a respective one of the first plurality of inputs and to operate on a common bit array. For example, as shown in FIG. 24, each of parallel bloom filter generator operators 2402a-2402n receives a respective one of inputs 2406a-2406n. Parallel bloom filter generator operators 2402a-2402n each apply an array of hash functions to data received on their respective inputs 2406a-2406n to generate an array of positions. Parallel bloom filter generator operators 2402a-2402n fill a common bit array 2410, rather than parallel bloom filter generator operators 2402a-2402n each filling their own bit array (e.g., bit array 806 shown in FIG. 8).

In step 2310, the bloom filter operator is replaced with a plurality of bloom filter operators. For example, as shown in FIG. 25, bloom filter operator 902 has been replaced with plurality of parallel bloom filter operators 2502a-2502n. Parallel bloom filter operators 2502a-2502n individually operate similarly to bloom filter operator 902 of FIG. 9A, but together execute faster than a single bloom filter operator 902. As shown in FIG. 25, each of bloom filter operators 2502a-2502n is positioned in a respective branch of a plurality of parallel branches 2508a-2508n that are children of an exchange operator 104.

In step 2312, each of the plurality of bloom filter operators is configured to receive a respective one of the second plurality of inputs and to compare a generated array of positions with the common bit array. For example, as shown in FIG. 25, each of parallel bloom filter operators 2502a-2502n receives a respective one of inputs 2506a-2506n. Parallel bloom filter operators 2502a-2502n each apply an array of hash functions to data received on their respective inputs 2506a-2506n to generate an array of positions. Parallel bloom filter operators 2502a-2502n compare the generated array of positions to respective positions in common bit array 2410 to determine whether the input data is in the set represented by common bit array 2410.

FIG. 26 shows a flowchart 2600 for parallelization of a filter operator, such as filter operator 1002 shown in FIG. 10, according to an example embodiment. Flowchart 2600 is described respect to an example query plan 2700 shown in tree form in FIG. 27. In FIG. 27, exchange operator 102 receives inputs from a plurality of parallel filter (PF) operators 2702a-2702n. Note that in an alternative embodiment, filter operators 2702a-2702n may be indirect children of exchange operator 102.

In step 2602, an input to the predicate filter generator operator is partitioned into a plurality of inputs. For example, filter operator 1002 of FIG. 10 has an input 1004, which is coupled to an output of a child operator (not shown in FIG. 10), such as a scan operator 402. In FIG. 27, input 1004 is partitioned into a plurality of inputs 2704a-2704n. Inputs 2704a-2704n may be received from parallel child operators of filter operator 1002.

In step 2604, the predicate filter operator is replaced with a plurality of predicate filter operators. For example, as shown in FIG. 27, filter operator 1002 has been replaced with plurality of parallel filter operators 2702a-2702n. Parallel filter operators 2702a-2702n individually operate similarly to filter operator 1002 of FIG. 10, but together enable an increased rate of operation relative to a single filter operator 1002. As shown in FIG. 27, each of filter operators 2702a-2702n is positioned in a respective branch of a plurality of parallel branches 2706a-2706n that are children of exchange operator 102.

In step 2606, each of the plurality of predicate filter operators is configured to receive a respective one of the plurality of inputs. For example, as shown in FIG. 27, filter operators 2702a-2702n each receive a respective one of inputs 2704a-2704n.

FIG. 28 shows a flowchart 2800 for parallelization of a nested loop join operator, such as nested loop join operator 1202 shown in FIG. 12, according to an example embodiment. Flowchart 2800 is described respect to an example query plan 2900 shown in tree form in FIG. 29. In FIG. 29, exchange operator 102 receives inputs from a plurality of parallel nested loop join (PNLJ) operators 2902a-2902n. Each of parallel nested loop join operators 2902a-2902n has a first input and a second input, and receives at the first input a respective output from one of a first plurality of parallel scan operators 2904a-2904n, and receives at the second input an output from scan operator 2906. In the example of FIG. 29, an original first scan operator (not shown in FIG. 29) was parallelized to form first plurality of parallel scan operators 2904a-2904n. First plurality of parallel scan operators 2904a-2904n scan data from a first table 2908 that was previously scanned by the original first scan operator. Scan operator 2906 scans data from a table 2910 in a similar fashion as prior to parallelization of nested loop join operator 1202.

In step 2802, the first input to the nested loop join operator is partitioned into a plurality of first inputs. For example, nested loop join operator 1202 of FIG. 12 has first input 1204, which is coupled to an output of a child operator (not shown in FIG. 12), such as a scan operator 402. In FIG. 29, first input 1204 is partitioned into a plurality of first inputs 2912a-2912n, which are each coupled to a respective output of one of parallel scan operators 2904a-2904n. Note that in an embodiment, the second (right) input to the nested loop join operator is not partitioned. Thus child operators on the right hand side of a nested loop join operate in parallel but each one repeats the same operation (e.g. a table scan as in FIG. 29) rather than splitting up the work.

In step 2804, the nested loop join operator is replaced with a plurality of nested loop join operators. For example, as shown in FIG. 29, nested loop join operator 1202 has been replaced with a plurality of parallel nested loop join operators 2902a-2902n. Parallel nested loop join operators 2902a-2902n individually operate similarly to nested loop join operator 1202 of FIG. 12, but together execute faster than a single nested loop join operator. Each of plurality of parallel nested loop join operators 2902a-2902n is positioned in a respective branch of a plurality of parallel branches 2914a-2914n of query plan 2900 that are children of exchange operator 102.

In step 2806, each of the plurality of nested loop join operators is configured to receive a respective one of the plurality of first inputs and to receive the second input. For example, as shown in FIG. 29, nested loop join operators 2902a-2902n each receive a respective one of first inputs 2912a-2912n, and each receive second input 2916.

Note that different types of joins implemented as nested loop join operators 1202, may be parallelized in a similar manner, in embodiments. For example, outer joins (e.g. left outer joins), inner joins, and semi joins implemented as nested loop join operators may be parallelized according to flowchart 2800.

FIG. 30 shows a flowchart 3000 for parallelization of a hash group by operator, such as hash group by operator 1402 shown in FIG. 14, according to an example embodiment. Flowchart 3000 is described with respect to an example query plan 3100 shown in tree form in FIG. 31. In FIG. 31, exchange operator 102 receives inputs from a plurality of parallel hash group by (PHGB) operators 3102a-3102n.

In step 3002, an input to the hash group by operator is partitioned into a plurality of inputs. For example, hash group by operator 1402 of FIG. 14 has an input 1404, which is coupled to an output of a child operator (not shown in FIG. 14), such as a scan operator 402. In FIG. 31, input 1404 is partitioned into a plurality of inputs 3104a-3104n. Inputs 3104a-3104n may be received from parallelized child operators of hash group by operator 1402.

In step 3004, the hash group by operator is replaced with a plurality of hash group by operators. For example, as shown in FIG. 31, hash group by operator 1402 has been replaced with plurality of hash group by operators 3102a-3102n. Parallel hash group by operators 3102a-3102n individually operate similarly to hash group by operator 1402 of FIG. 14, but execute faster than a single hash group by operator 1402. As shown in FIG. 31, each of hash group by operators 3102a-3102n is positioned in a respective branch of a plurality of parallel branches 3106a-3106n that emanate from exchange operator 102.

In step 3006, an additional hash group by operator is positioned in the query tree. For example, as shown in FIG. 31, an additional hash group by operator 3108 is positioned in query plan 3100.

In step 3008, an input to the additional hash group by operator is coupled to an output of the exchange operator. For example, as shown in FIG. 31, an input 3110 of hash group by operator 3108 is coupled to output 106 of exchange operator 102.

Query plans having any number of operators can be parallelized according to embodiments of the present invention. For example, FIG. 32 shows a parallelized query plan 3200, which is a parallelization of query plan 1600 shown in FIG. 16. As shown in FIG. 32, query plan 3200 includes hash group by operator 3108, exchange operator 102, first and second parallelized hash group by operators 3102a and 3102b, first and second parallelized nested loop join operators 2902a and 2902b, a first and second parallelized filter operators 2702a and 2702b, first and second parallelized bloom filter generators 2402a and 2402b, bloom filter operator 802, first and second parallelized hash join operators 2202a and 2202b, a first pair 3202 of first and second parallelized scan operators 2002a and 2002b, a second pair 3204 of first and second parallelized scan operators 2002a and 2002b, second hash join operator 602b, a third scan operator 402c, and a fourth scan operator 402d. Structure and operation of parallelized query plan 3200 is described as follows.

At the bottom of query plan 3200, scan operators 402a and 402b of query plan 1600 are parallelized into first pair 3202 of first and second parallelized scan operators 2002a and 2002b and second pair 3204 of first and second parallelized scan operators 2002a and 2002b, respectively. First pair 3202 scans table 1602, and second pair 3204 scans table 1604.

First hash join operator 602a of FIG. 16 is parallelized into first and second parallelized hash join operators 2202a and 2202b of FIG. 32. A first input of first hash join operator 2202a is coupled to an output of scan operator 2002a of first pair 3202 and a second input of first hash join operator 2202a is coupled to an output of scan operator 2002a of second pair 3204. A first input of second hash join operator 2202b is coupled to an output of scan operator 2002b of first pair 3202 and a second input of second hash join operator 2202b is coupled to an output of scan operator 2002b of second pair 3204.

Bloom filter generator 802 of FIG. 16 is parallelized into first and second parallelized bloom filter generator operators 2402a and 2402b of FIG. 32. An input of first bloom filter generator operator 2402a is coupled to an output of first hash join operator 2202a. An input of second bloom filter generator operator 2402b is coupled to an output of second hash join operator 2202b. First and second bloom filter generator operators 2402a and 2402b operate on a common bit array (not shown in FIG. 32), as described above.

Filter operator 1002 of FIG. 16 is parallelized into first and second parallelized filter operators 2702a and 2702b of FIG. 32. An input of first filter operator 2702a is coupled to an output of first bloom filter generator operator 2402a. An input of second filter operator 2702b is coupled to an output of second bloom filter generator operator 2402b.

Nested loop join operator 1202 of FIG. 16 is parallelized into first and second parallel nested loop join operators 2902a and 2902b of FIG. 32. A first input of first nested loop join operator 2902a is coupled to an output of first filter operator 2702a. A second input of first nested loop join operator 2902a is coupled to an output of hash join operator 602b. A first input of second nested loop join operator 2902b is coupled to an output of second filter operator 2702b. A second input of second nested loop join operator 2902b is coupled to an output of hash join operator 602b.

Note that hash join operator 602b of FIG. 16 is not changed in FIG. 32. This is because hash join operator 602b is coupled to the second input of nested loop join operator 1202 in FIG. 20. As described above, a second input of nested loop join operator 1202 is not partitioned when nested loop join operator is parallelized. Rather, the operation is repeated by each consumer of the input. Thus, hash join operator 602b is not changed in FIG. 32, and bloom filter operator 902, third scan operator 402c, and fourth scan operator 402d are therefore not changed. Note further that in FIG. 32, bloom filter operator 802 accesses the common bit array generated by first and second parallel bloom filter generators 2402a and 2402b.

Hash group by operator 1402 is parallelized into first and second parallel hash group by operators 3102a and 3102b. First and second parallel hash group by operators 3102a and 3102b each have an input coupled to an output of a corresponding one of nested loop join operators 2902a and 2902b.

Exchange operator 102 is positioned in query tree 3200 (according to step 1702 of flowchart 1700). A first input of exchange operator 102 is coupled to an output of first hash group by operator 3102a. A second input of exchange operator 102 is coupled to an output of second hash group by operator 3102b. Exchange operator 102 buffers data output by first and second hash group by operators 3102a and 3102b.

Hash group by operator 3108 is positioned in query tree 3200 (according to step 3006 of flowchart 3000). An input of hash group by operator 3108 is coupled to an output of exchange operator 104.

Thus, as shown in FIG. 32, query plan 3200 is a parallelization of query plan 1600 of FIG. 16. First and second parallel branches 3206 and 3208 are formed, and an additional parent branch 3210 (having hash group by operator 3108) is formed, with all three branches emanating from exchange operator 102. In an embodiment, branches that emanate from an exchange operator 102 may be executed by separate processor threads. In the example of FIG. 32, first branch 3206 may be executed by a first thread, second branch 3208 may be processed by a second thread, and hash group by operator 3108 of third branch 3210 may be processed by a third thread. Note that the number of threads may be determined by the number of children of the exchange, and may be determined in a manner unrelated to the number of operators in the original tree.

Query plan trees may be parallelized into any number of branches, as desired. Various operators are shown in FIG. 32 for illustrative purposes, and alternative operators may also be present, including those described above and/or other operators known to persons skilled in the relevant art(s). Furthermore, any number of operators may be present in query tree that is parallelized.

Example Computer Implementation

In an embodiment of the present invention, the system and components of the present invention described herein are implemented using well known servers/computers, such as computer 3302 shown in FIG. 33. For example, computer system 114 and server 116 shown in FIG. 1 can be implemented using computers 3302.

The computer 3302 can be any commercially available and well known computer capable of performing the functions described herein, such as computers available from International Business Machines, Apple, Sun, HP, Dell, Compaq, Digital, Cray, etc.

The computer 3302 includes one or more processors (also called central processing units, or CPUs), such as a processor 3306. The processor 3306 is connected to a communication bus 3304. In some embodiments, processor 3306 can simultaneously operate multiple computing threads.

The computer 3302 also includes a main or primary memory 3308, such as random access memory (RAM). The primary memory 3308 has stored therein control logic 3328A (computer software), and data.

The computer 3302 also includes one or more secondary storage devices 3310. The secondary storage devices 3310 include, for example, a hard disk drive 3312 and/or a removable storage device or drive 3314, as well as other types of storage devices, such as memory cards and memory sticks. The removable storage drive 3314 represents a floppy disk drive, a magnetic tape drive, a compact disk drive, an optical storage device, tape backup, etc.

The removable storage drive 3314 interacts with a removable storage unit 3316. The removable storage unit 3316 includes a computer useable or readable storage medium 3324 having stored therein computer software 3328B (control logic) and/or data. Removable storage unit 3316 represents a floppy disk, magnetic tape, compact disk, DVD, optical storage disk, or any other computer data storage device. The removable storage drive 3314 reads from and/or writes to the removable storage unit 3316 in a well known manner.

The computer 3302 also includes input/output/display devices 3322, such as monitors, keyboards, pointing devices, etc.

The computer 3302 further includes a communication or network interface 3318. The network interface 3318 enables the computer 3302 to communicate with remote devices. For example, the network interface 3318 allows the computer 3302 to communicate over communication networks or mediums 3324B (representing a form of a computer useable or readable medium), such as LANs, WANs, the Internet, etc. The network interface 3318 may interface with remote sites or networks via wired or wireless connections.

Control logic 3328C may be transmitted to and from the computer 3302 via the communication medium 3324B. More particularly, the computer 3302 may receive and transmit carrier waves (electromagnetic signals) modulated with control logic 3330 via the communication medium 3324B.

Any apparatus or manufacture comprising a computer useable or readable medium having control logic (software) stored therein is referred to herein as a computer program product or program storage device. This includes, but is not limited to, the computer 3302, the main memory 3308, the secondary storage devices 3310, the removable storage unit 3316 and the carrier waves modulated with control logic 3330. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computer-implemented method for parallelizing a database query plan, comprising:
    positioning, by a computer, a data flow exchange operator in a database query tree, wherein the exchange operator comprises a plurality of buffers, and wherein the exchange operator is configured to receive inputs from a plurality of parallel operators;
    parallelizing, by the computer, a first child operator of the exchange operator into a plurality of parallel second child operators, each of the parallel second child operators coupled to the exchange operator in a respective branch of a plurality of parallel branches of the query tree;
    wherein each branch of the parallel branches is configured to be processed by a respective processor thread;
    wherein each of the plurality of second child operators has a first input, and wherein the parallelizing comprises:
        partitioning an input of the first child operator into a plurality of first inputs; and
        replacing the first child operator with the plurality of second child operators, each of the plurality of second child operators being positioned in a respective branch of the plurality of parallel branches and coupled to one of said plurality of first inputs; and
    buffering, at the exchange operator, in respective ones of the plurality of buffers, an output of each of the plurality of parallel second child operators.

2. The computer-implemented method of claim 1, wherein the child operator is a hash join operator, wherein said parallelizing further comprises:
    generating a plurality of hash tables, comprising the step of generating a hash table for each of the plurality of first inputs;
    merging the plurality of hash tables into a combined hash table; and
    configuring the hash join operator to probe the combined hash table with a corresponding second input.

3. The computer-implemented method of claim 1, wherein the child operator is a bloom filter operator having a corresponding bloom filter generator operator, wherein said parallelizing further comprises:
    partitioning an input to the bloom filter operator into a second plurality of inputs;
    configuring the bloom filter generator operator to receive one of the first plurality of inputs and to operate on a common bit array;
    replacing the bloom filter operator with a plurality of bloom filter operators, each of the plurality of bloom filter operators being positioned in a respective branch of the plurality of parallel branches; and
    configuring each of the plurality of bloom filter operators to receive a respective one of the second plurality of inputs and to compare a generated array of positions with the common bit array.

4. The computer-implemented method of claim 1, wherein the child operator is a predicate filter operator, wherein said parallelizing further comprises:
    configuring the predicate filter operator to receive one of the plurality of inputs.

5. The computer-implemented method of claim 1, wherein the child operator is a nested loop join operator having a first input and a second input, wherein said parallelizing further comprises:
    configuring the nested loop join operator to receive one of the plurality of first inputs and to receive the second input.

6. The computer-implemented method of claim 1, wherein the child operator is a hash group by operator, and wherein hash group by operator receives one of the plurality of inputs, and wherein said parallelizing further comprises:
    replacing the hash group
    coupling an input to the additional hash group by operator to an output of the exchange operator.

7. The computer-implemented method of claim 1, wherein the child operator of the exchange operator has a second child operator, further comprising parallelizing the second child operator into a second plurality of child operators.

8. The computer-implemented method of claim 7, wherein the second child operator is a scan operator, wherein said parallelizing comprises replacing the scan operator with a plurality of scan operators, each of the plurality of scan operators being positioned in a respective branch of the plurality of parallel branches, and being coupled to an input of one of the first plurality of child operators.

9. The computer-implemented method of claim 8, further comprising configuring each of the plurality of scan operators to access a common table in a first-come first-serve manner.

10. The computer-implemented method of claim 9, further comprising configuring each of the plurality of scan operators to scan a page of data per access of the common table.

11. The computer-implemented method of claim 8, wherein each of the plurality of scan operators is configured to perform a table scan.

12. The computer-implemented method of claim 9, wherein each of the plurality of scan operator is configured to perform an index scan, further comprising configuring each of the plurality of scan operators to scan a leaf page of data per access of the common database.

13. A system comprising:
a processor; and
a memory storing control logic, that when executed by the processor, causes the processor to generate a database query plan tree comprising:
a data flow exchange operator comprising a plurality of buffers in the memory, wherein the exchange operator is configured to buffer received inputs from a plurality of parallel operators; and
a plurality of parallel child operators, each of the parallel child operators coupled to a respective input of the exchange operator in a respective branch of a plurality of parallel branches of the tree,
wherein each branch of the parallel branches is configured to be processed by a respective processor thread;
wherein each of the plurality of parallel child operators has a first input, and wherein the data flow exchange operator is further configured to:
partition the first input of each of the plurality of parallel child operators into a plurality of first inputs; and
replace each of the plurality of parallel child operators with a plurality of child operators, each of the plurality of child operators being positioned in a respective branch of the plurality of parallel branches of the tree;
wherein the exchange operator is further configured to store an output of each of the plurality of parallel child operators in respective ones of the plurality of buffers in memory.

14. The system of claim 13, wherein each of the parallel child operators is a hash join operator, further comprising:
a combined hash table that is a merge of a plurality of hash tables, wherein the plurality of hash tables includes a hash join operator generated for each hash join operator from the first input of each hash join operator;
wherein each of hash join operator is configured to probe the combined hash table with a corresponding second input.

15. The system of claim 13, wherein each of the parallel child operators is a bloom filter operator, wherein each bloom filter operator is positioned in a respective branch of the plurality of parallel branches and wherein each bloom filter operator is configured to generated array of positions from an input, and to compare the generated array of positions with a common bit array.

16. The system of claim 13, wherein each of the parallel child operators is a predicate filter operator.

17. The system of claim 13, wherein each of the parallel child operators is a nested loop join operator having the first input and a second input, wherein the first input of each nested loop join operator is coupled to a different child operator, wherein the second input of each nested loop join operator is coupled to a common child operator.

18. The system of claim 13, wherein each of the parallel child operators is a hash group by operator, further comprising an additional hash group by operator coupled to an output of the exchange operator.

19. The system of claim 13, further comprising:
a second plurality of parallel child operators, wherein each child operator of the second plurality of parallel child operators is coupled to the first input of a respective one of the first plurality of parallel child operators.

20. The system of claim 19, wherein each child operator of the second plurality of child operators is a scan operator.

21. The system of claim 20, wherein each scan operator is configured to access a common database in a first-come first-serve manner.

22. The system of claim 21, wherein each scan operator is configured to scan a page of data per access of the common database.

23. The system of claim 22, wherein each scan operator is configured to perform a table scan.

24. The system of claim 21, wherein each scan operator is configured to perform an index scan; wherein each scan operator is configured to scan a leaf page of data per access of the common database.

25. A computer program product comprising a computer-readable storage medium having computer readable program code stored thereon that, in response to execution by a processor, causes the processor to improve performance of a database query plan by performing operations comprising:
positioning a data flow exchange operator in a database query tree;
parallelizing a child operator of the exchange operator into a plurality of parallel child operators, each of the parallel child operators coupled to the exchange operator in a respective branch of a plurality of branches of the query tree,
wherein each branch of the parallel branches is configured to be processed by a respective processor thread;
wherein each of the plurality of parallel child operators has a first input, and wherein the parallelizing comprises:
partitioning the first input of each of the child operators into a plurality of first inputs; and
replacing the child operator with the plurality of child operators, each of the plurality of child operators being positioned in a respective branch of the plurality of parallel branches of the query tree; and
buffering, in a plurality of buffers, an output of each of the plurality of parallel child operators at the exchange operator.

26. The computer program product of claim 25, wherein the child operator is a hash join operator, wherein the parallelizing further comprises:
generating a plurality of hash tables, comprising the step of generating a hash table for each of the plurality of first inputs;
merging the plurality of hash tables into a combined hash table; and
computer readable program code for enabling a processor to configure the hash join operator to probe the combined hash table with a corresponding second input.

27. The computer program product of claim 25, wherein the child operator is a predicate filter operator, wherein the parallelizing further comprises:
configuring the predicate filter operator to receive one of the plurality of inputs.

28. The computer program product of claim 25, wherein the child operator of the exchange operator has a second child operator, the parallelizing further comprising parallelizing the second child operator into a second plurality of child operators.

* * * * *